(12) United States Patent
Sundberg et al.

US010650166B1

(10) Patent No.: US 10,650,166 B1
(45) Date of Patent: *May 12, 2020

(54) APPLICATION REMOTING USING NETWORK VECTOR RENDERING

(71) Applicant: CLOUDFLARE, INC., San Francisco, CA (US)

(72) Inventors: Trevor Sundberg, Kirkland, WA (US); Killian Koenig, Seattle, WA (US); Darren Remington, Mesa, AZ (US); Benjamin Buzbee, Woodinville, WA (US); Michael Conrad, Monroe, WA (US); David Harnett, Seattle, WA (US)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/659,482

(22) Filed: Oct. 21, 2019

Related U.S. Application Data

(63) Continuation of application No. 16/503,388, filed on Jul. 3, 2019, now Pat. No. 10,452,868, which is a
(Continued)

(51) Int. Cl.
*G06F 21/62* (2013.01)
*G06F 21/71* (2013.01)

(52) U.S. Cl.
CPC ........ *G06F 21/629* (2013.01); *G06F 21/6245* (2013.01); *G06F 21/6281* (2013.01); *G06F 21/71* (2013.01)

(58) Field of Classification Search
CPC .............. G06F 21/629; G06F 21/6281; G06F 21/6245; G06F 21/71
See application file for complete search history.

(56) References Cited

U.S. PATENT DOCUMENTS 5,835,096 A   11/1998   Baldwin
6,384,821 B1   5/2002   Borrel et al.
(Continued)

FOREIGN PATENT DOCUMENTS

CN   102316093   1/2012
CN   102333075   1/2012
(Continued)

OTHER PUBLICATIONS

"Ericom Shield Remote Browser Isolation, Protect Your Endpoints and Network From Browser-Based Attacks," Data Sheet, Ericom, Jan. 1, 2018, 2 pages.
(Continued)

*Primary Examiner* — Darren B Schwartz

(57) ABSTRACT

Methods, systems, and techniques for application isolation by remote-enabling applications are provided. Example embodiments provide an Adaptive Rendering Application Isolation System ("ARAIS"), which transparently and dynamically enables applications to run in an isolated execution environment yet be rendered locally in a manner that minimizes the amount of data to be transferred and the latency caused by expensive computation and/or by overburdening available bandwidth by remoting rendering using draw commands over rendering using pixel pushing or other techniques. In one embodiment, the ARAIS includes an orchestrator server which comprises remoting level determination logic and rules engine, pre-computed graphics libraries, connection support logic, data repositories for objects such as a render cache, whitelists, blacklists, client privileges, and application information, and one or more secure containers running remote application instances. These components cooperate to deliver isolation-ready technology to client applications.

20 Claims, 9 Drawing Sheets

Related U.S. Application Data continuation of application No. 16/389,879, filed on Apr. 19, 2019.

(60) Provisional application No. 62/843,205, filed on May 3, 2019, provisional application No. 62/800,948, filed on Feb. 4, 2019, provisional application No. 62/800,937, filed on Feb. 4, 2019.

(56) References Cited

U.S. PATENT DOCUMENTS

| | | |
|---|---|---|
| 6,704,024 B2 | 3/2004 | Robotham et al. |
| 7,552,467 B2 | 6/2009 | Lindsay |
| 7,634,810 B2 | 12/2009 | Goodman et al. |
| 7,657,837 B2 | 2/2010 | Shappir et al. |
| 7,982,749 B2 | 7/2011 | Mathew et al. |
| 7,984,500 B1 | 7/2011 | Khanna et al. |
| 8,019,995 B2 | 9/2011 | van Bemmel |
| 8,176,434 B2 | 5/2012 | Saul et al. |
| 8,189,661 B2 | 5/2012 | Abdo et al. |
| 8,214,899 B2 | 7/2012 | Chien |
| 8,220,047 B1 | 7/2012 | Soghoian et al. |
| 8,291,065 B2 | 10/2012 | Goodman et al. |
| 8,306,807 B2 | 11/2012 | Van Guilder et al. |
| 8,307,103 B2 | 11/2012 | Abdo et al. |
| 8,332,626 B2 | 12/2012 | Mansfield |
| 8,370,899 B2 | 2/2013 | Shoval et al. |
| 8,375,434 B2 | 2/2013 | Cottrell et al. |
| 8,474,035 B2 | 6/2013 | Wei et al. |
| 8,607,054 B2 | 12/2013 | Ramarathinam et al. |
| 8,615,795 B2 | 12/2013 | Cottrell et al. |
| 8,621,604 B2 | 12/2013 | Chien |
| 8,762,861 B2 | 6/2014 | Hyndman et al. |
| 8,763,009 B2 | 6/2014 | Degirmenci et al. |
| 8,776,169 B2 | 7/2014 | Rajagopal et al. |
| 8,799,357 B2 | 8/2014 | Clift et al. |
| 8,866,701 B2 | 10/2014 | Momchilov et al. |
| 8,881,227 B2 | 11/2014 | Rajagopal et al. |
| 8,913,068 B1 | 12/2014 | Kokkevis et al. |
| 8,941,673 B2 | 1/2015 | Larsson |
| 8,949,726 B2 | 2/2015 | Kominac et al. |
| 8,970,450 B2 | 3/2015 | Momchilov |
| 9,015,090 B2 | 4/2015 | Chien |
| 9,075,895 B2 | 7/2015 | Lindsey et al. |
| 9,092,249 B2 | 7/2015 | Stone |
| 9,167,020 B2 | 10/2015 | Abdo et al. |
| 9,244,912 B1 | 1/2016 | Kominac et al. |
| 9,246,904 B2 | 1/2016 | Rajagopal et al. |
| 9,363,134 B1 | 6/2016 | Goodspeed |
| 9,367,947 B2 | 6/2016 | Stone |
| 9,391,832 B1 | 7/2016 | Song et al. |
| 9,395,885 B1 | 7/2016 | Kominac et al. |
| 9,430,036 B1 | 8/2016 | Kominac et al. |
| 9,460,284 B1 | 10/2016 | Hajmasan et al. |
| 9,521,118 B2 | 12/2016 | Cottrell et al. |
| 9,535,560 B1 | 1/2017 | Kominac et al. |
| 9,537,873 B2 | 1/2017 | Petry et al. |
| 9,582,600 B1 | 2/2017 | Killian et al. |
| 9,646,394 B2 | 5/2017 | Lindsey |
| 9,674,145 B2 | 6/2017 | Chien |
| 9,767,110 B2 | 9/2017 | Lindsey et al. |
| 9,912,677 B2 | 3/2018 | Chien |
| 9,954,825 B2 | 4/2018 | Prey et al. |
| 9,965,133 B1 | 5/2018 | Lindsey et al. |
| 10,002,403 B2 | 6/2018 | Abdo et al. |
| 10,027,700 B2 | 7/2018 | Petry et al. |
| 10,084,791 B2 | 9/2018 | Chien |
| 10,185,761 B2 | 1/2019 | Mahjoub et al. |
| 2001/0000265 A1 | 4/2001 | Schreiber et al. |
| 2002/0078255 A1 | 6/2002 | Narayan |
| 2002/0154214 A1 | 10/2002 | Scallie et al. |
| 2003/0177172 A1 | 9/2003 | Duursma et al. |
| 2004/0049530 A1 | 3/2004 | Lok et al. |
| 2004/0085310 A1 | 5/2004 | Snuffer |
| 2004/0165007 A1 | 8/2004 | Shafron |
| 2004/0179262 A1 | 9/2004 | Harman et al. |
| 2004/0183756 A1 | 9/2004 | Freitas et al. |
| 2005/0012749 A1 | 1/2005 | Gonzalez et al. |
| 2005/0140694 A1 | 6/2005 | Subramanian et al. |
| 2005/0257243 A1 | 11/2005 | Baker |
| 2006/0123478 A1 | 6/2006 | Rehfuss et al. |
| 2006/0184614 A1 | 8/2006 | Baratto et al. |
| 2006/0200535 A1 | 9/2006 | Moser |
| 2006/0230105 A1 | 10/2006 | Shappir et al. |
| 2006/0230438 A1 | 10/2006 | Shappir et al. |
| 2006/0248571 A1 | 11/2006 | Ruge |
| 2006/0285172 A1 | 12/2006 | Hull et al. |
| 2007/0055749 A1 | 3/2007 | Chien |
| 2007/0067104 A1 | 3/2007 | Mays |
| 2007/0211065 A1 | 9/2007 | Feth et al. |
| 2008/0042923 A1 | 2/2008 | De Laet |
| 2008/0100626 A1 | 5/2008 | Diard |
| 2008/0170622 A1 | 7/2008 | Gordon et al. |
| 2008/0211816 A1 | 9/2008 | Gonzalez et al. |
| 2008/0212942 A1 | 9/2008 | Gordon et al. |
| 2008/0301566 A1 | 12/2008 | Abdo et al. |
| 2009/0190028 A1 | 7/2009 | Rodriguez et al. |
| 2009/0207167 A1 | 8/2009 | Pasetto |
| 2009/0259588 A1 | 10/2009 | Lindsay |
| 2009/0303245 A1 | 12/2009 | Soupikov et al. |
| 2009/0305790 A1 | 12/2009 | Lu et al. |
| 2009/0327354 A1 | 12/2009 | Resnick et al. |
| 2009/0328109 A1 | 12/2009 | Pavlovskaia et al. |
| 2010/0013842 A1 | 1/2010 | Green et al. |
| 2010/0020098 A1 | 1/2010 | Elmieh et al. |
| 2010/0158109 A1 | 6/2010 | Dahlby et al. |
| 2010/0254603 A1 | 10/2010 | Rivera |
| 2011/0010455 A1 | 1/2011 | Wolfe et al. |
| 2011/0055922 A1 | 3/2011 | Cohen et al. |
| 2011/0078532 A1 | 3/2011 | Vonog et al. |
| 2011/0141123 A1 | 6/2011 | Kumar et al. |
| 2011/0157196 A1 | 6/2011 | Nave et al. |
| 2011/0173564 A1 | 7/2011 | Margarint et al. |
| 2011/0260948 A1 | 10/2011 | Teng et al. |
| 2012/0081353 A1 | 4/2012 | Yusupov et al. |
| 2012/0084791 A1 | 4/2012 | Benedek et al. |
| 2012/0108330 A1 | 5/2012 | Dietrich, Jr. et al. |
| 2012/0113091 A1 | 5/2012 | Isaacson |
| 2012/0117145 A1 | 5/2012 | Clift et al. |
| 2012/0151371 A1 | 6/2012 | Kominac et al. |
| 2012/0206463 A1 | 8/2012 | Reid et al. |
| 2012/0210333 A1 | 8/2012 | Potter et al. |
| 2012/0226742 A1 | 9/2012 | Momchilov et al. |
| 2012/0262379 A1 | 10/2012 | King |
| 2012/0317236 A1 | 12/2012 | Abdo et al. |
| 2013/0113833 A1 | 5/2013 | Larsson |
| 2013/0127858 A1 | 5/2013 | Leroy et al. |
| 2014/0184622 A1 | 7/2014 | Xia |
| 2014/0208442 A1 | 7/2014 | Mooring |
| 2014/0310809 A1 | 10/2014 | Li et al. |
| 2015/0058923 A1 | 2/2015 | Rajagopal et al. |
| 2015/0161754 A1 | 6/2015 | Isaacson |
| 2015/0195106 A1 | 7/2015 | Sehr et al. |
| 2015/0222600 A1 | 8/2015 | Cottrell et al. |
| 2015/0350295 A1 | 12/2015 | Isaacson |
| 2015/0373148 A1 | 12/2015 | He et al. |
| 2016/0085603 A1 | 3/2016 | Degirmenci et al. |
| 2016/0330260 A1 | 11/2016 | Ruge |
| 2017/0019393 A1 | 1/2017 | Rajagopal et al. |
| 2017/0041332 A1 | 2/2017 | Mahjoub et al. |
| 2017/0046013 A1 | 2/2017 | Reskusich et al. |
| 2017/0078406 A1 | 3/2017 | Ruge |
| 2017/0269953 A1 | 9/2017 | Prey et al. |
| 2018/0113794 A1 | 4/2018 | Yang et al. |
| 2018/0159896 A1 | 6/2018 | Soman et al. |
| 2018/0247075 A1 | 8/2018 | Aistrope |
| 2018/0307508 A1 | 10/2018 | Banerjee et al. |
| 2018/0309728 A1 | 10/2018 | Schwebke et al. |
| 2018/0324145 A1 | 11/2018 | Petry et al. |
| 2018/0324206 A1 | 11/2018 | Petry et al. |
| 2018/0338166 A1 | 11/2018 | Amiga et al. |
| 2018/0349283 A1 | 12/2018 | Bhatia et al. |

(56) References Cited

U.S. PATENT DOCUMENTS

| | | | |
|---|---|---|---|
| 2019/0058738 | A1 | 2/2019 | Adams et al. |
| 2019/0075130 | A1 | 3/2019 | Petry et al. |
| 2019/0279332 | A1 | 9/2019 | Kruglick |

FOREIGN PATENT DOCUMENTS

| | | |
|---|---|---|
| CN | 102333110 | 1/2012 |
| CN | 102333306 | 1/2012 |
| CN | 103997487 | 8/2014 |
| CN | 107801052 | 3/2018 |
| EP | 2 403 206 | 1/2012 |
| EP | 2 403 207 | 1/2012 |
| EP | 3 104 271 | 12/2016 |
| KR | 10-1914207 | 11/2018 |
| WO | 2014/035936 | 3/2014 |
| WO | 2015/023316 | 2/2015 |
| WO | 2016/177678 | 11/2016 |

OTHER PUBLICATIONS

Gupta et al., "Defending against phishing attacks: taxonomy of methods, current issues and future directions," Telecommun Syst (2018) 67:247, https://doi.org/10.1007/s11235-017-0334-z, retrieved from the Internet through springer.com, 18 pages.
"How can I implement authentication in my proxy server?," Information Security Stack Exchange, Aug. 1, 2013, retrieved from the Internet through security.stackexchange.com on Apr. 15, 2019, 8 pages.
Isaacson, "Cloud Graphical Rendering: Background to Ascender's Solution Part I," Ascender Technologies Ltd., Aug. 2013, retrieved from the Internet through www.ascender.com on Jan. 18, 2019, 8 pages.
Isaacson, "Cloud Graphical Rendering: Background to Ascender's Solution Part II," Version 1.5, Ascender Technologies Ltd., Aug. 2013, retrieved from the Internet through ascendercom on Jan. 18, 2019, 3 pages.
Isaacson, "Cloud Graphical Rendering: A New Paradigm," Version 1.6, Ascender Technologies Ltd., Aug. 2013, retrieved from the Internet through www.ascender.com on Jan. 18, 2019, 28 pages.
Isaacson, "Cloud Graphical Rendering: A New Paradigm," Version 1.7, Ascender Technologies Ltd., Aug. 2013, 30 pages.
Isaacson, "Procedural Compression: Efficient, Low Bandwidth Remote Android Graphics," Ascender Technologies Ltd., Jan. 1, 2014, 24 pages.
Isaacson, "Remote Android Rendering Summary," Ascender Technologies Ltd., Jan. 1, 2014, 8 pages.
Isaacson, "Remote Android Rendering," Ascender Technologies Ltd., Jan. 1, 2014, 38 pages.
Isaacson, "Remote Graphical Rendering," Ascender Technologies Ltd., Jan. 1, 2012, 44 pages.
Kobes, Steve (skobes@chromium.org), "Life of a Pixel," Google LLC, Jun. 2018, 55 pages.
Kobes, Steve (skobes@chromium.org), "Life of a Pixel" (with comments), Google LLC, Jun. 2018, 55 pages.
"Menlo Security Isolation Platform, Adaptive Clientless Rendering," Menlo Security, Menlo Park, California, Jan. 1, 2016, 8 pages.
"Remote Browser Isolation Technology," WEBGAP, retrieved on the Internet on Feb. 20, 2019, at https://webgap.io/browser-isolation-technology.html, 3 pages.
"Remote Desktop Protocol: Graphics Device Interface (GDI) Acceleration Extensions," Microsoft Corporation, Jun. 1, 2017, 260 pages.
"Remote Graphics FAQ," Ascender Technologies Ltd., retrieved from the Internet on Jan. 18, 2019, at http://www.ascender.com/remote-graphics/faq, 8 pages.
"Symantec Web Isolation, Advanced Threat Prevention Capabilities for Secure Web Gateways," Data Sheet, Symantec Corporation, Mountain View, California, Jan. 1, 2017, 2 pages.
U.S. Appl. No. 13/281,460 (Isaacson).
U.S. Appl. No. 14/102,341 (Isaacson).
U.S. Appl. No. 14/169,989 (Cottrell et al.).
U.S. Appl. No. 14/288,764 (Isaacson).
U.S. Appl. No. 15/281,440 (Rajagopal et al.).
U.S. Appl. No. 15/998,399 (Adams et al.).
"Using Cookie-based Authentication with a Forward Proxy," Novell, Micro Focus, posted May 24, 2002, current version: BorderManager 3.7, retrieved from the Internet on Apr. 15, 2019, at https://www.novell.com/coolsolutions/feature/7830.html, 2 pages.
"WebGL Demo Technical Explanation," Ascender Technologies Ltd., retrieved from the Internet on Jan. 22, 2019, at http://www.ascender.com/webgl-demo/webgl-demo-technical-explanation, 3 pages.
"Weblife Service: Next Gen Web Use Isolation," Technology Data Sheet, Weblife, Jan. 1, 2017, 2 pages.
Yue et al., "BogusBiter: A Transparent Protection Against Phishing Attacks," ACM Trans. Internet Technol. 10, 2, Article 6 (May 2010), 31 pages.

APPLICATION REMOTING USING NETWORK VECTOR RENDERING

CROSS-REFERENCE TO RELATED APPLICATIONS

The present application is related to U.S. Provisional Application No. 62/800,948 entitled APPLICATION REMOTING USING NETWORK VECTOR RENDERING and filed Feb. 4, 2019, U.S. Provisional Application No. 62/800,937 entitled WEB BROWSER REMOTING USING NETWORK VECTOR RENDERING and filed Feb. 4, 2019, U.S. Non-Provisional application Ser. No. 16/389,879 entitled THEFT PREVENTION FOR SENSITIVE INFORMATION and filed Apr. 19, 2019, U.S. Provisional Application No. 62/843,205 entitled LOCAL ISOLATOR APPLICATION WITH COHESIVE APPLICATION-ISOLATION INTERFACE and filed May 3, 2019, U.S. Non-Provisional application Ser. No. 16/503,393, entitled APPLICATION REMOTING USING NETWORK VECTOR RENDERING and filed Jul. 3, 2019, U.S. Non-Provisional application Ser. No. 16/503,388, entitled WEB BROWSER REMOTING USING NETWORK VECTOR RENDERING and filed Jul. 3, 2019, U.S. Non-Provisional application Ser. No. 16/509,278, entitled LOCAL ISOLATOR APPLICATION WITH COHESIVE APPLICATION-ISOLATION INTERFACE and filed Jul. 11, 2019, and U.S. Non-Provisional application Ser. No. 16/554,384, entitled APPLICATION REMOTING USING NETWORK VECTOR RENDERING and filed Aug. 28, 2019, the entirety of each of which is hereby incorporated by reference.

TECHNICAL FIELD

The present disclosure relates to methods, techniques, and systems for remoting applications across a network and, in particular, to methods, techniques, and systems for providing secure applications by remoting them using draw commands.

BACKGROUND

Bad actors and cyber-attackers create malicious websites that install malware onto or otherwise attack a user's machine (whether that machine is a PC, Mac, tablet, phone, virtual-reality headset, augmented/mixed reality headset, or other computing device). These attackers can infect a user's machine at many levels, including taking advantage of security holes in operating systems and applications interfaces to system resources and drivers. One solution has been to restrict a user's direct access to the interface to the operating system (the "desktop") from which applications are run and to "remote" the desktop so that it runs in a protected space (e.g., a sandbox or virtual machine) on a server computing system. There are many protocols for forwarding input from the client computing system to the remote desktop and for sending back the output from the remoted desktop application, including Remote Desktop Protocol (RDP) and other similar protocols, all of which communicate output from the remote desktop by sending pixels or video. One difficulty with RDP and similar protocols is that they are specific to desktop operating systems and will not provide an ideal user experience with a web browsing session because the desktop input and output is intercepted at the interface to the underlying operating system. In addition, they may rely on specific operating system services and drivers being present on a client device. For example, RDP assumes a client device supports GDI (a WINDOWS® operating system graphics device interface) which may not be available on non-Windows based devices and other less ideal graphics interfaces are used for those non-Windows based devices. Another difficulty is that they are limited to transfers of pixels (as bitmaps) when remoting to non-Windows operating system clients. Another solution has been to isolate applications on the client computing system in a sandbox such as a virtual machine or equivalent on the client machine itself. However, a disadvantage is that, should an attack somehow escape the sandbox, it can attack the entire client computing system where it is likely to have personally identifiable information linked to the user rather than a remote server. Another disadvantage is that client-side isolation may require installing software on the client computing system.

Additionally, exploits within web browsers provide many avenues for attackers to steal information, gain access, or install malware to a user's machine (whether that machine is a PC, Mac, tablet, phone or other computing device). For example, malicious code can take advantage of a flaw or vulnerability in the operating system or browser software to breach browser security. Active content in today's browsers, such as through use of Flash and/or JavaScript, contributes to browser vulnerability by enabling attackers to identify memory locations, scrape data, and generate malicious code. For example, an exploit might change browser settings without the user's knowledge, or even run arbitrary code by exploiting flaws in the many technologies that execute within the browser, such as HTML, JavaScript, CSS, Java, images, video, etc. As another example, websites can be injected with malicious code which results in 'clickless' infections by which malware is downloaded without requiring the user to do anything but visit the website. This downloaded malware may then steal credential information, effect identify theft, etc. Most problems caused by such attacks are treated "ex post facto" and cannot be prevented in total.

One manner of securing an application is to execute the application remotely on a server instead of locally on a client device where the hosted remoted application can be protected inside of a sandbox, such as a virtual machine. When the application is a web browser, this is sometimes referred to as "browser isolation." One difficulty with using this approach with web browsers is that such browsers require extensive CPU, GPU, and memory resources making them expensive to run on a server.

Several attempted solutions have been employed to address these obstacles and to allow web browsers to be isolated by running them as remote processes. One such solution is to employ "pixel pushing" or "pixel mirroring" which allows a web page to be rendered remotely utilizing a web browser running on an external server to execute any active code associated with the web page and to produce a series of images which are sent back to a client web browser as compressed pixels or video (using for example H264 video format) to be eventually rendered by the web browser on the client device. This approach suffers from high bandwidth usage for sending pixel data, high server cost due to video rasterizing and encoding, high latency in the user experience, and rendering artifacts due to use of lossy compression or video encoding. In addition, malicious code can still penetrate the output sent to the endpoint (client) by changing pixels to embed malicious code to send bad data.

Another solution is to employ "Document Object Model" (DOM) remoting/mirroring. With this solution, the DOM corresponding to a page is sanitized before it is sent to the client to remove potentially malicious code and reconstructed on the client before rendering. This solution yields typically better performance than pixel pushing, but provides a less secure environment. Using DOM mirroring, a sanitizing process on the isolated browser computing system (e.g., a server) identifies bad HTML and active content and cleans up the DOM tree and reformats it without the active content or with content that has been transcoded into a safe format. Since the DOM on the isolated browser (the server) includes HTML, JavaScript, etc., malware still has plenty of opportunities to embed itself and surface. DOM mirroring also fails to support dynamic content (for example, WebGL or Flash), and each browser type renders DOM content differently, which leaves users with inconsistent or unpredictable experiences. Some companies offer solutions that allow a user, such as an IT administrator, to choose how much security is desired versus performance and employ a choice of using DOM mirroring and pixel pushing.

DETAILED DESCRIPTION

Figure 1:
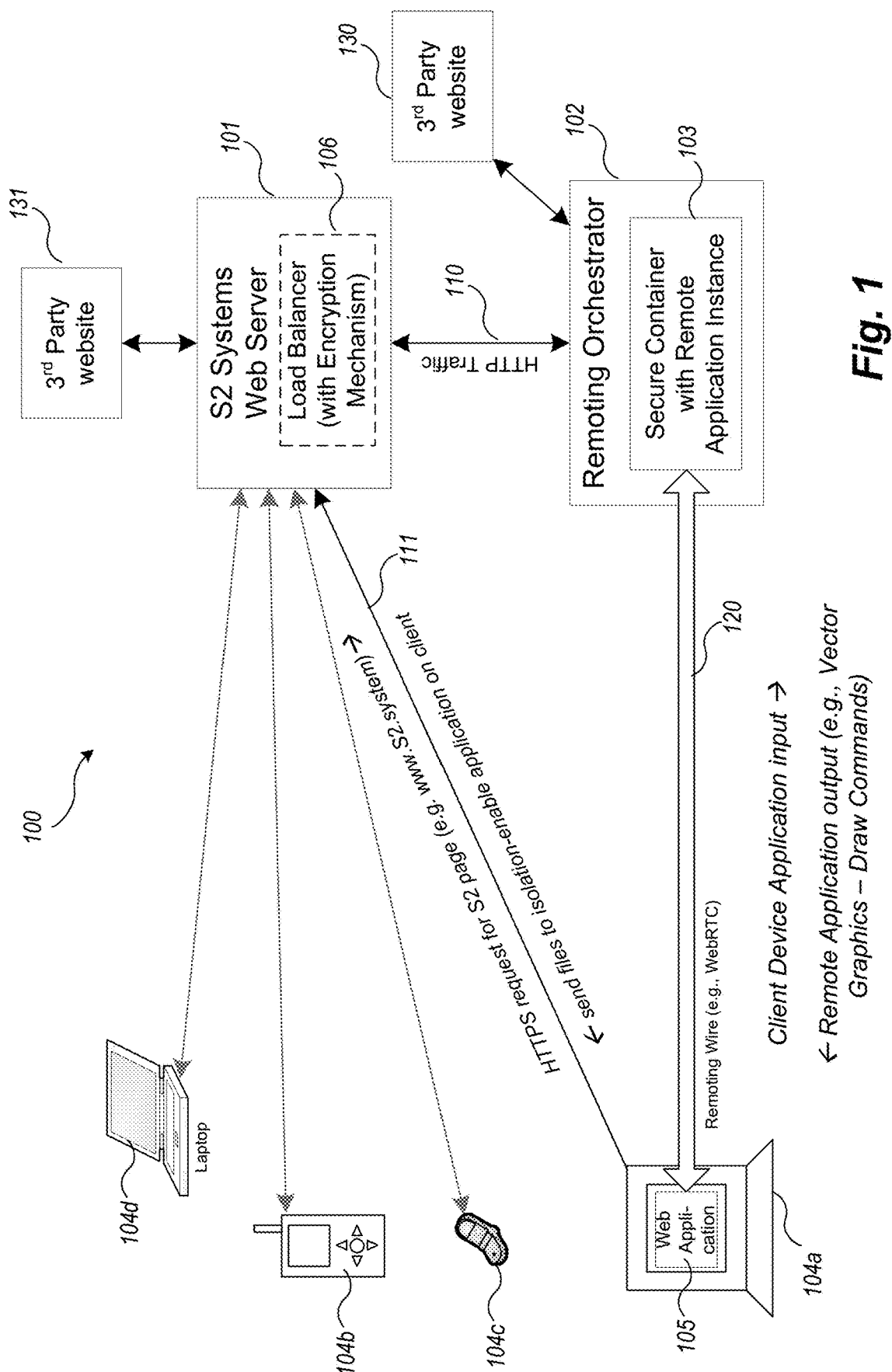
FIG. 1 is an example block diagram of an example secure computing environment for executing remoted applications in isolation using an example Adaptive Rendering Application Isolation System.

Embodiments described herein provide enhanced computer- and network-based methods, techniques, and systems for isolating applications, including web browser applications, to provide more secure environments and reduce unauthorized security vulnerabilities. Example embodiments provide an Adaptive Rendering Application Isolation System ("ARAIS"), which transparently and dynamically enables an existing application to run in an isolated execution environment yet be rendered locally in a manner that minimizes the amount of data to be transferred and the latency caused by expensive computation and/or by over-burdening available bandwidth. In particular, the ARAIS overcomes the problems and inefficiencies of prior isolation solutions by transferring output from the isolated execution environment to the application running locally using draw commands or other higher level graphics primitives where possible instead of using pixels (or bitmaps/video) and by intercepting rendering on the isolated execution environment at a higher level in the graphics rendering pipeline than rasterization. Unlike pixel pushing systems, the ARAIS solution allows the use of less expensive execution (e.g., server) machines that do not require massive and expensive amounts of hardware (such as GPU farms) for rasterization and video encoding. In addition, the rendering data for transport can be optimized, encoded, compressed, packetized (and subsequently depacketized, decompressed, and decoded), etc. based upon proprietary or existing protocols and potentially dynamically based upon known or computed characteristics or rules. By avoiding the transportation of video (pixel pushing) and instead transferring rendering data at a "higher level," application output can be rendered identically on the isolated execution environment and on the local rendering environment at least because lossy compression is not required to reduce the bandwidth consumption to acceptable levels (unlike pixel pushing). Thus, rendering artifacts due, for example, to the use of video encoding or lossy compression can be eliminated or nearly eliminated.

In addition, the ARAIS provides a self-contained delivery mechanism for enabling existing applications such as web browsers to be "isolation-ready" such that they can immediately utilize the secure ARAIS environment without additional coding or configuration by an administrator or end user. Thus, the ARAIS provides a transparent mechanism for equipping a web browser application to be executed remotely and rendered locally; thus, protecting the web browser from malicious attacks. Also, by equipping existing applications with the code and resources needed to be isolation-ready on demand, the ARAIS can handle compatibility issues such as differences between operating systems, web browsers, versions of graphics and other libraries, etc. transparently to the existing application.

Although this disclosure typically refers to the isolated execution environment as a server computing system and the local rendering environment as a client computing system, in example ARAIS environments, the isolated execution environment may be any type of separate environment that allows the isolation-enabled application to be executed independently from where its output is ultimately rendered. Thus, the ARAIS also may be implemented as a peer-to-peer system. In addition, the server system may comprise one or more server systems or servers on a single computing system. For example, the isolated execution environment may be located on a separate computing system from the rendering device or may be located on the same device. In some cases, the isolation execution environment may be located on a separate computing system from the rendering device, and the separate computing system may be hosted entirely in one or more server computing devices that are located in a different premises as the rendering device (e.g., using cloud computing for the one or more server computing devices. In other cases, the isolation execution environment may be located on a separate computing system from the rendering device, and the separate computing system may be hosted completely or partially in one or more server computing devices located in the same premises as the rendering device (e.g., using primarily an on-premises server computing device for low latency, and using a cloud computing device when the on-premises server computing device experiences spikes in user activity). When using the same computing system, a separate instance of the application could be executed in a sandboxed (e.g., containerized or virtualized) environment and used to perform code execution and send rendering data to the instance of the application ultimately responsible for rendering output. Such an architecture allows the application code to be executed safely and separately from the process responsible for rendering output, for example, to an end user. In addition, separation of code execution from output rendering can lead to performance gains in some applications. For example, code execution could be executed on a machine with significantly higher network or CPU resources.

FIG. 1 is an example block diagram of an example secure computing environment for executing remoted applications in isolation using an example Adaptive Rendering Application Isolation System. The remote execution environment 100 comprises one or more client devices 104a-d (e.g., a laptop, mobile devices, desktops, or other systems, such as a virtual-reality or augmented/mixed reality headset), a public web server 101, one or more third party websites or data repositories 130 and 131 from which requested content is retrieved, and one or more internal remoting orchestrator servers 102. As explained above, all of these servers can be part of each other and located physically remotely from the client devices 104a-d or can be located on the same physical machine as the client endpoint, or in any other architectural layout amenable to isolation (e.g., via sandboxing, containerization, or virtualization).

In overview, an application such as web application 105 (local application) executing (running) on a client device such as client device 104a requests a web page, typically using an HTTPS request. To become isolation enabled, this client request is redirected by a secure component of the web server 101, such as load balancer 106, to a local server, such as orchestration server 102, so that an isolated execution environment, such as secure container with a remote application instance 103, can be configured specifically for that client device (the local application running on the client device). This configuration involves setting up a secure connection 120 (e.g., a real-time secure connection such as WebRTC, Hyper Text Transfer Protocol Secure (HTTPS) web sockets, or others) between the local application 105 and the isolated execution environment 103. In some scenarios, the connection is directly between the location application 105 and the executing remote instance within the secure container 103 to avoid additional latency. The secure container may be implemented using any mechanism that provides security isolation, such as containerization offered by Docker Inc.'s "Docker" software platform, which provides operating-system-level virtualization across operating system platforms using a "light weight" virtualization solution (containers share an operating system kernel), or more traditional virtualization products (virtual machine implementations) offered for example by third parties.

In one example preferred configuration for web browser applications, the web server 101 resorts to known techniques provided by load balancer 106 or other secure component provided, for example by AWS, AZURE, or another cloud based server infrastructure mechanism, for securely communicating (e.g., via public/private key encryption) initially with the client device 104a. That way, if any of the isolated execution environments instantiated on behalf of client devices become compromised, the security of the public web server 101 (such as its private key) is not exposed or compromised. In this example configuration, the load balancer 106 translates client requests into HTTP and redirects the request to the orchestration server 102 via communication 110 using HTTP. All communication between applications running on the client device 104a and the remote execution environment 100 is through the secure public web server 101 using HTTPS until the orchestration server 102 is able to establish a secure connection 120 between the local application 105 executing on the client device 104a and the corresponding remote instance within the secure container 103 (isolated execution environment). Thereafter, remoting communication is performed via the secure connection 120 directly between the isolated execution environment 103 and the local application 105.

In one example ARAIS, the secure connection 120 is implemented using WebRTC, because WebRTC allows both UDP/IP connections (which uses non-sequenced packets) and TCP/IP connections (which uses sequenced packets) and thus provides greater flexibility. In addition, when using UDP, the secure connection 120 is typically faster. Other secure connection solutions 120 can be used, including for example WebSockets, RDP, and proprietary or other standard known solutions. Implementations of the secure connection 120 preferably support peer-to-peer and unreliable communication channels (e.g., WebRTC) because, when applications can take full advantage of unreliable channels, average latency is typically reduced, especially under lossy network conditions where traditional ordered, reliable mechanisms (e.g., TCP) can suffer from large spikes due to head-of-line blocking.

A secure WebRTC connection can be set up by the client leveraging the secure connection (HTTPS) between the client computing system and web server 101. For example, in one possible configuration, as part of the page returned in response to the initial (redirect) request of a web browser 105 running on the client device 104a (typically for the "home page"), a packet is returned by the web server 101 (via load balancer 106) containing a file "index.html" which includes initial logic and a key for setting up a WebSocket connection between the local application 105 and the remoting orchestrator 102. As parts of its standard execution loop, the browser application 105 executes the logic in the initial file, which includes logic to start up the WebSocket connection. In some instances the key for this connection is directly hardcoded into the initial html page returned. In other instances, a separate request is made by the local application 105 for the key as a result of executing the html and potentially JavaScript on the initial page. The purpose of this WebSocket connection is to facilitate setting up the secure WebRTC connection using the orchestrator server 102 as the "signal server" (known broker) for establishing a peer to peer connection between application 105 and the instantiated secure container with the remote instance 103 using the WebRTC negotiation protocol.

Meanwhile, after receiving the initial request for the home page, the orchestrator 102 determines which application instance to instantiate in a secure container 103 and sets up a WebSocket connection to this instance (using for example another key). The orchestrator in its return of the initial page to the load balancer 106 can also include an identifier of this remote application instance so that the web server 101 can direct further requests to the correct secure container. Once both WebSocket connections have been made—to the local application 105 and to the secure container running the remote application instance 103—then the orchestrator can act as the signal server. A negotiation can then take place between the location application 105 (performed as a result of executing the logic on the initial or subsequent pages) and the secure container 103 for the WebRTC connection using the orchestrator 102 as the broker. This negotiation generally succeeds (subject to servers going offline) because the orchestrator has working (WebSocket) connections to both parties.

Of note, this is but one technique for initiating a secure connection directly between the local application 105 and the secure container with the remote application instance 103. Other techniques using other protocols and/or other types of connections can be similarly incorporated.

In conjunction with configuring a corresponding isolated execution environment 103, the orchestration server 102 causes remoting code/logic and potentially other resources to be downloaded to the application 105 running on the client device 104*a* via communications paths 110 and 111. Specifically, the remote-enabling files for application 105 on client device 104*a* are determined by the orchestrator server 102, sent via path 110 (using HTTP) to the load balancer 106 running on web server 101, which responds to the client request via path 111 using HTTPS. In one instance, these files are sent as a result of executing logic in the initial file that directs the local application 105 to request these files. In some scenarios, additional and separate computing systems are used to provide these files, giving another step of indirection hence more security but potentially increasing latency. Another advantage to using separate servers for delivering these files is to use different providers based upon the determined rendering level, determine interception techniques, or the like.

The orchestrator server 102 determined files are then "hooked into" (integrated, appended, etc. to) the running local application 105 such that the location application 105 becomes isolation-ready and can communicate with the remote application instance running in the secure container 103 (the isolated execution environment). The integration of the remoting logic into a Chromium web browser to effect an example isolation-ready application is described further below with respect to FIG. 4. The remote-enabling files include logic for rendering output within the local application 105 (thereby replacing or augmenting the default rendering routines or hooking into them) and logic for intercepting input to the local application and forwarding it to the remoted application instance 103.

The remoting logic can be hooked into the running local application 105 by a variety of possible known mechanisms such as by callback mechanisms that take advantage of known architectures and attributes of the application (typically useful when the source code for the location application is known or familiar); hooking known or discoverable application programming interface ("API"); object code injection that replaces portions of the local application's executable code with a different portion of executable code; extending the local application using known plug-in or extension mechanisms; dynamically linking in shared libraries; and the like. Each of these solutions may have advantages and disadvantages based upon how easy it is to integrate into the application to be remote-enabled. For example, injecting code, which typically involves rewriting compiled code to redirect function calls to another location (where alternative code sequence is defined). Tools that analyze for security flaws are not typically meant to operate on this level because they are typically employed to analyze source code. In addition, it is easy to introduce incompatibilities when versions change.

Once the secure connection 120 is established, the general flow of data between the local application 120 and the isolated execution environment 103 is that client device local application 105 input, such as keystrokes, mouse and other cursor and input events is intercepted by the remoting code previously integrated into the local application 105 and forwarded to the remote application instance 103 via the secure connection 120. The remote application instance 103 then performs whatever execution is being requested, including, for example, downloading web pages or content via a third party website 130, applying stylesheet definitions (.css), and executing JavaScript for web browser applications, to generate rendering output. The rendering output is then packaged, including optional encoding, optimization, and enhancing, and forwarded via the secure connection 120 back to the local application 105 to be rendered on a display of the client device 104*a* using the remoting code previously integrated into the local application.

Multiple paths exist for directing the initial client communication to the remote execution web server 101 instead of directly to the target server associated with the initial client request. For example, using a web browser as an example local application, if the user runs a web browser and tries to open the "www.cnn.com" page, then this request must be somehow redirected to web server 101 instead. In some example ARAIS environments, this redirection is done transparently to an end user. For example, a system administrator in an enterprise may push a domain policy that configures a proxy client on all of its employees' machines to point to the remote web server 101. The enterprise might also employ a gateway that automatically routes all traffic to the web server 101. This solution would also work for an arbitrary application that uses protocols other than HTTP requests (such as any protocol built on top of TCP/IP or UDP). As another example, an extension may be configured for a browser that changes the browser's internal proxy settings to point to web server 101 or intercepts any URLs entered by a user of the client device 104*a* and reformats them to point to the web server 101. As yet another example, and useful generally for remoting applications transparently to the end user, code can be installed to intercept traffic at a network gateway and redirect it to the web server 101. Alternatively, this redirection can be performed manually. Different ones of these solutions may require different levels of configuration and result in different amounts of transparency to the end user.

Although the techniques of an Adaptive Rendering Application Isolation System are generally applicable to isolating any type of application, including web applications such as web browsers and more enterprise-friendly applications, one goal of the ARAIS is to provide an environment wherein the execution tasks of the application are performed in an isolated environment separate from where the output is rendered and the input is received. Further, transfer of the rendering output data from the remote application instance to the local application is performed using as high a level of rendering output as possible such that the fidelity of information is not lost and that rendering is performed on the local application with as small a data transmission size and as little latency as possible while providing a highly secure environment that minimizes security vulnerabilities. A higher level of graphics rendering data, such as using draw commands from a library such as SKIA or Cairo (which uses vector graphics), generally uses less bandwidth and a smaller size of transmitted data than transfer of lower level graphics, especially pixel transfers. As well, vector based rendering is more easily amenable to things such as scaling. Thus, it is often preferable to transport vector commands (draw commands), or even commands translated to a lower level in the graphics pipeline (such as using OpenGL, WebGL, DirectX, Vulkan or other GPU commands) which draws in points, lines, and vertices and loses information such as curve information. These assumptions vary with need. For example, vector based rendering cannot easily represent high quality pictures (such as those taken from a camera) or video, so typically these types of data are 'passed through' and rendered as is (not as a vector image).

Although the examples described herein often refer to a web browser based upon the (open source) Chromium browser engine and technology, the techniques described herein can also be used by other browser engines and with graphics libraries other than SKIA. For example, the techniques described herein may be applicable to any application that renders using the SKIA graphics library or that is based upon Chromium, including but not limited to Electron based applications, such as Slack, Microsoft Teams, or Skype, to name a few. In addition, the techniques described here may be applied to Android applications that render to SKIA, although modifications may be required to intercept SKIA commands. Also, similar techniques may be used with other vector graphics libraries such as Cairo (used by WebKit based browsers and web applications). In addition, when application source code is available it is possible to enhance the application more easily to accommodate ARAIS isolation mechanisms. Yet, even when source code is not available, isolation-enabled applications can still be made possible by hooking draw calls of existing applications to intercept the graphics to render output in an ARAIS compatible format which can be determined by running and analyzing applications (either manually, automatically or a mixture of using a computer and manual analysis) to determine their rendering pipeline. In a more difficult case (or where the tradeoffs indicate that pixel data is the best option, for example for performance or quality), pixel pushing can be resorted to. Further, ARAIS can employ an adaptive remoting scheme based upon a rules engine that incorporates potentially dynamic factors as described further below with respect to FIG. 7. So, for example, applications that use GDI can also be isolation-enabled by capturing and forwarding rendered output at the level of GDI calls using an open source version of GDI or using a compatible library (which can be compiled and run as well on the local application). The rules engine may employ one or more tables that define locations at which different applications may be intercepted or may employ heuristics (for example, machine learning, artificial intelligence, or others) to dynamically determine the locations for interception (for example, different defined or discovered interception locations or methods may be employed for EXCEL, WORD, or other applications or versions of those applications).

Also, although certain terms are used primarily herein, other terms could be used interchangeably to yield equivalent embodiments and examples. In addition, terms may have alternate spellings which may or may not be explicitly mentioned, and all such variations of terms are intended to be included.

Example embodiments described herein provide applications, tools, data structures and other support to implement an Adaptive Rendering Application Isolation System to provide a more secure environment for running applications. Other embodiments of the described techniques may be used for other purposes, including for enhancing performance of remotely executing applications. In the following description, numerous specific details are set forth, such as data formats and code sequences, etc., in order to provide a thorough understanding of the described techniques. The examples described also can be practiced without some of the specific details described herein, or with other specific details, such as changes with respect to the ordering of the logic, different logic, etc. Thus, the scope of the techniques, block descriptions, and/or functions described are not limited by the particular order, selection, or decomposition of aspects described with reference to any particular routine, module, component, and the like.

Figure 2:
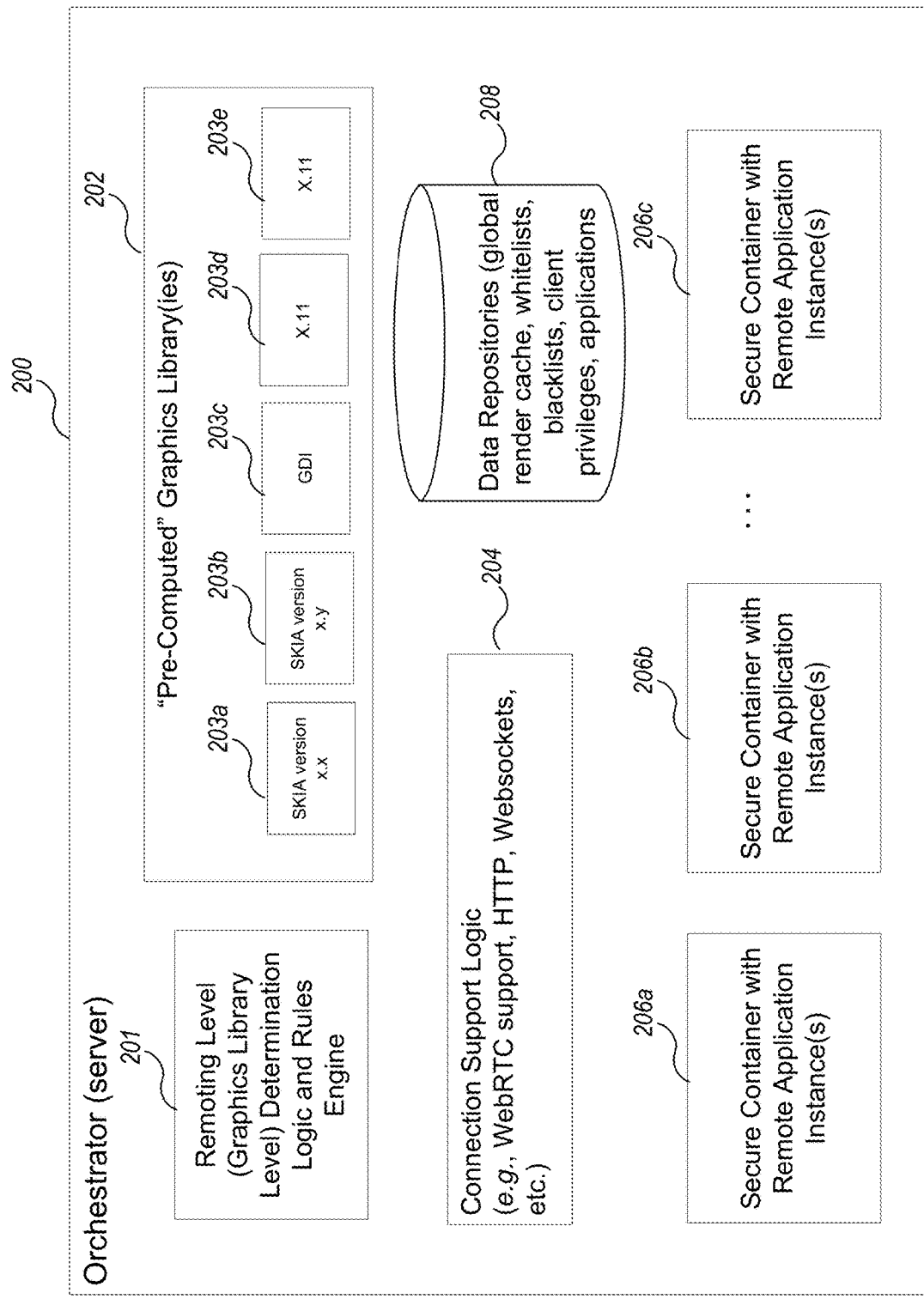
FIG. 2 is an example block diagram of components of an example orchestrator server computing system for performing application isolation in an example Adaptive Rendering Application Isolation System.

FIG. 2 is an example block diagram of components of an example orchestrator server computing system for performing application isolation in an example Adaptive Rendering Application Isolation System. In one example embodiment, an orchestrator server (such as Remoting Orchestrator 102) comprises one or more functional components/modules that work together to deliver remote-enabling technology to client applications. For example, an orchestrator server 200 may comprise remoting level determination logic and rules engine 201; pre-computed graphics libraries 202 or other rendering logic such as different versions of SKIA, GDI, X11, etc. (203*a*-*e*); connection support logic 204; data repositories (storage) 208 for objects such as a render cache, whitelists, blacklists, client privileges, and application information; and one or more secure containers running remote application instances.

The connection support logic 204 is responsible for making a secure connection (such as connection 120) to each client application that is requesting a remote-enabled application (e.g., web browser) either explicitly or transparently and for communicating with the load balancer 106 of the web server 101 to initiate a remote-enabled application. The connection support logic may be implemented for any type of secure connection over a network/Internet, including for example WebRTC, which provides peer-to-peer connectivity, and/or WebSockets, which uses TCP and provides client/server style connectivity. Other protocols can be similarly implemented.

The orchestrator 200 is also responsible for pre-computing rendering code 202 for delivery to local applications that are to be remote-enabled. In other examples, the rendering code 202 is generated offline during a building process in which a graphics library is compiled, and the orchestrator 200 delivers the compiled library to the client. In one example ARAIS, the "pre-computed" rendering code 202 is pre-compiled to WebAssembly .wasm files. Other versions of the ARAIS may include other "pre-computed" formats of graphics rendering code using, for example, "asm.js," a subset of JavaScript. For non-web-based applications and others, these pre-computed formats may be written in other languages and using other formats. These pre-computed files contain the code that is integrated into the client (local) application to remote-enable an application so that it comes "isolation-ready." Libraries 202 can include other types of rendering code libraries other than what are shown in files 203*a*-*e*. For example, they can include code that renders pixels, video, WebGL, OpenGL, etc. The pre-computed rendering code is delivered to a requesting client application when the ARAIS web server needs to remote-enable an application. This code is delivered to the local application "on demand" so that it can contain exactly the same version as what is being used to render on the isolation execution environment (the remote application) side. This insures compatibility between the isolation execution environment and the local rendering environment even between different versions of the application or libraries. For example, in C++, preprocessor defines are typically used to influence program behavior at build time, and the precompiled rendering code can be built with the same settings that would have been used on the server to ensure that the same code is executed during the rasterization process on the client computing device that would traditionally happen on the server. In effect, everything rendered on the client device is rendered the same as on the execution environment. This is distinct from solutions such as RDP which do not guarantee that what is rendered on the local desktop is consistent with what is rendered (computed to be rendered) remotely. For example, if the remote server is using a different version of GDI than the client device, then the computed rendering output to be displayed on the client device may look different than what was computed, which could lead to annoying behavior or even look like defects. Using the ARAIS techniques, a Chrome browser, for example, which uses the size of the font to compute layer information, will calculate a same result on the isolation execution environment as on the client device. Having different versions of pre-computed libraries, such as 203a and 203b, allows the orchestrator 200 to accommodate different client computing systems and/or users without the application/browser having to concern itself with compatibility between versions.

In some scenarios it may be desirable that the rendering code in the execution environment remote application instance is different than the rendering code sent to the client. These scenarios also can be accommodated by the ARAIS techniques.

The remoting level determination logic and rules engine 201 is responsible for determining the logic and/or files to forward to the client computing system to remote-enable an application. It is also responsible for determining the "level" of rendering interception and hence the characteristics of a corresponding remote application to be instantiated 206a-c for intercepting rendering calls to forward rending output at the determined level. As discussed further below with respect to FIGS. 4, 7, and 8, this determination may be based upon any one or more characteristics of the client device, the local application, as well as the user or other factors. Further, this determination may be made manually, automatically by the orchestrator, or a mixture of both. In some instances, it may include a rules engine which uses machine learning tools to determine the appropriate graphics level for interception and logic/files to forward to the client computing system to remote-enable an application.

Once a determination of appropriate rendering interception level is determined, the orchestrator 200 is responsible for instantiating and containerizing a remote application instance such as in secure containers 206a-c. In one example ARAIS, each secure container 206a-c is a Docker instance (a secure container), which operates as a lightweight virtualization mechanism because it shares a single operating system kernel across all containers. In order to provide the desired isolation, there is at least a separate container and remote application instance 206x for each local application process of a single client. Thus, for example, a web browser with multiple tabs (or what resolves to a single application process) from a first client computing device will execute in container 206a, whereas a browser associated with a different client computing device or another running browser process in the same client will execute in container 206b. In other configurations, a separate container is instantiated for each tab as well to provide an even great level of security. One advantage to using a single secure container for all tabs of a web browser application, is that the user experience between tabs can be shared. Upon instantiating and creating a secure connection to the client computing system, a "cookie" or similar identifier or tag is used to identify the client-application process pair. This identifier is then used by the orchestrator 200 to identify the appropriate container when a new tab for an existing process, for example, is launched.

The orchestrator 200 uses data repositories 208 to store a variety of information. In a system that supports web browsers or other web applications (that request content using URLs), one such item is a rendering output cache that stores, for example, frequently visited web pages. This cache of pages can speed up the rendering process for all clients taking advantage of multiple client behaviors across usages. Pages that are visited more frequently can have their corresponding rendering output data (such as drawing command regions such as drawing command quads) cached for quick recall. In addition, the cache can be tailored to weight the storage of rendering output corresponding to particular web pages based upon certain characteristics like the importance of a user within an enterprise, frequency of use, or other factors. In addition to caching on a per orchestrator instance, each secure container may cache its own rendering output data using a local cache as described below with respect to FIGS. 3A and 3B.

In addition, the data repositories 208 may be used to store other information related to performance and/or security of the execution environments running in the secure containers 206a-c. For example, repositories 208 may store whitelists and/or blacklists of users, third party websites or content, privileges associated with client computing systems and/or users, and applications information for applications that are able to be remote-enabled. Other information may also be stored.

Figure 3:
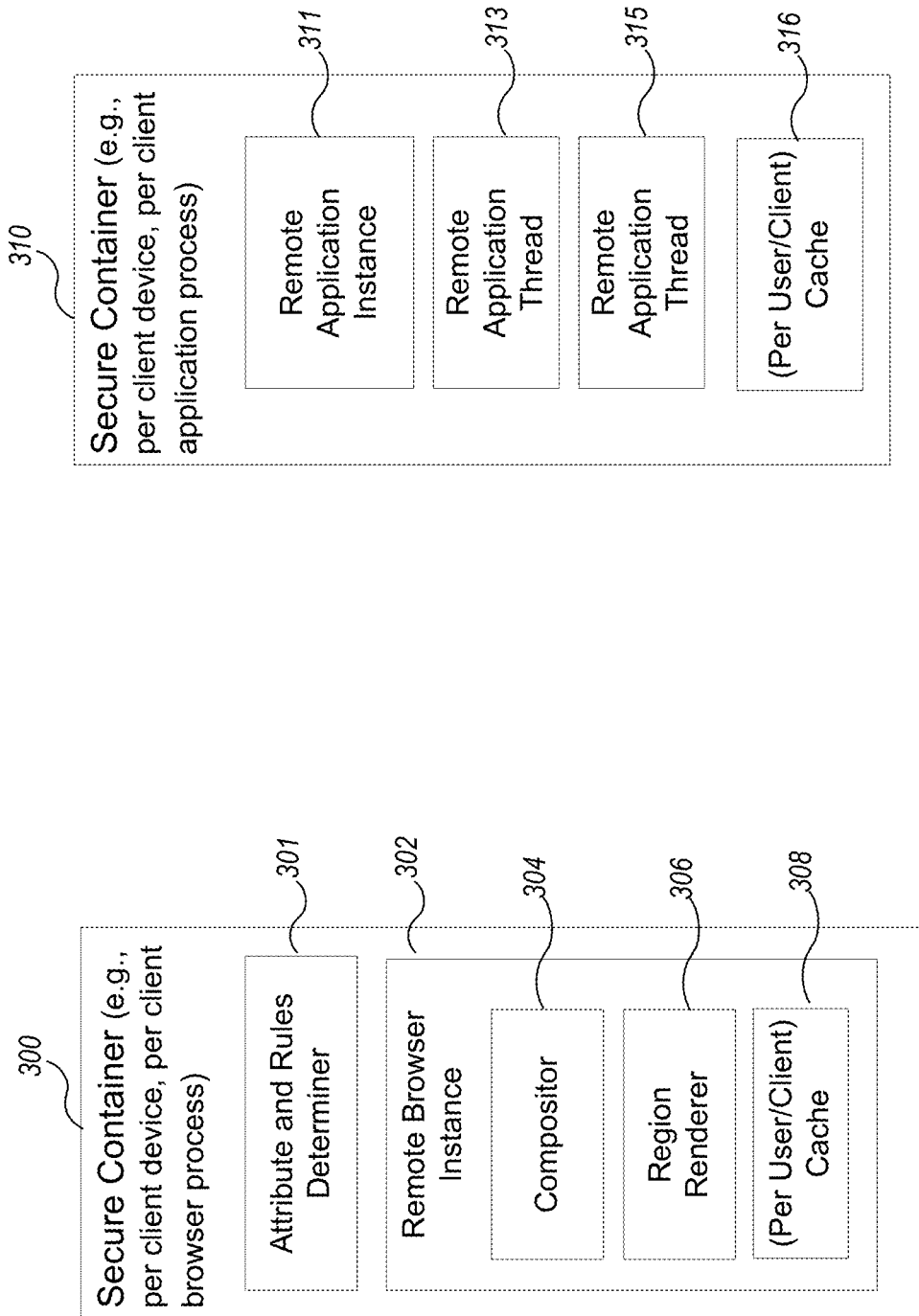
FIG. 3A is an example block diagram of an isolated remote browser instance running in an example execution environment of an example Adaptive Rendering Application Isolation System.
FIG. 3B is an example block diagram of an isolated remote application instance running in an example execution environment of an example Adaptive Rendering Application Isolation System.

FIG. 3A is an example block diagram of an isolated remote browser instance running in an example execution environment of an example Adaptive Rendering Application Isolation System. As explained with respect to FIGS. 1 and 2, secure container 300 provides an isolated execution environment for a corresponding remote instance of a web browser running on a client computing system. Separating the execution actions of the web browser from the rendering allows the ARAIS to minimize vulnerabilities potentially caused by downloading web pages or content via a third party website, execution of code such as JavaScript (embedded or as separately provided as a downloaded code file) or applying stylesheet definitions (.css). Any malicious tinkering with the executable code in the remote browser instance is then restricted to affecting the secure container. Further, when the client web browser exits, the secure container is removed so that any malware is not perpetuated by the orchestrator server. For non-web-based applications, separation of code execution provides similar benefits.

In an example ARAIS, secure container 300 contains an attribute and rules determiner 301 (module, engine, code logic, or the like), and a remote web browser instance 302 which corresponds to the intercepted request for a page by the client web browser as explained with respect to FIG. 1. This instance runs in the isolation environment provided by the secure container 300 to restrict any malicious code or effects from same to that container. Thus, other client computing systems' remote instances are not infected by anything that may occur in instance 302. The remote browser instance 302 may contain one or more portions of rendering code, for example, compositor 304 and region renderer 306 (for example, quad renderer or a renderer associated with a region of the output wherein the region has a predefined or dynamically defined shape), for rendering the output generated by the executing code. These portions of rendering code constitute a rendering (or graphics) pipeline and often differ between different web browsers such as those built on Chromium (which currently employs the SKIA library) versus those built on WebKit (which currently employs the CAIRO graphics library). Thus, the compositor 304 and region renderer 306 represent placeholders for portions of code that are used in the remote browser's rendering pipeline.

Which remote browser instance 302 to instantiate in the secure container 300 is determined based upon the attribute and rules determiner 301. This determination is described further with respect to FIG. 4. In one example, when remoting Chromium based applications, an enhanced version of the Chromium browser is used. Because Chromium is open source, the rendering pipeline can be modified to accommodate the determined interception and remoting performed by ARAIS. Similar modifications can be made to any web-based application for which source code is available, although the logic and places for interception in the web-based application may vary and may be tuned for that application.

Figure 5:
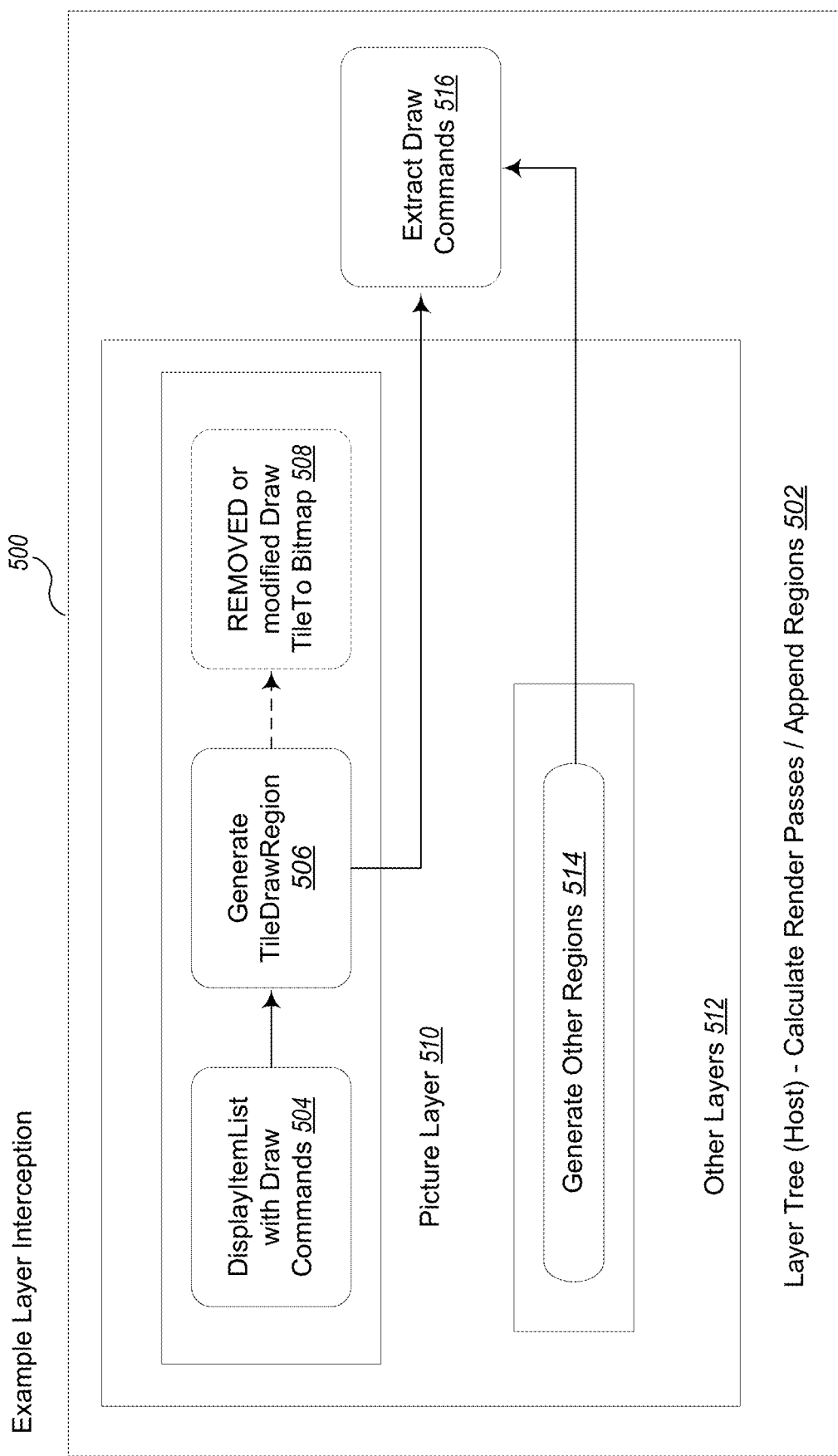
FIG. 5 is an example block diagram illustrating remote side code interception for adapting content in an isolated web browser application for delivery as draw commands to a corresponding rendering endpoint in an example Adaptive Rendering Application Isolation System.
Figure 6:
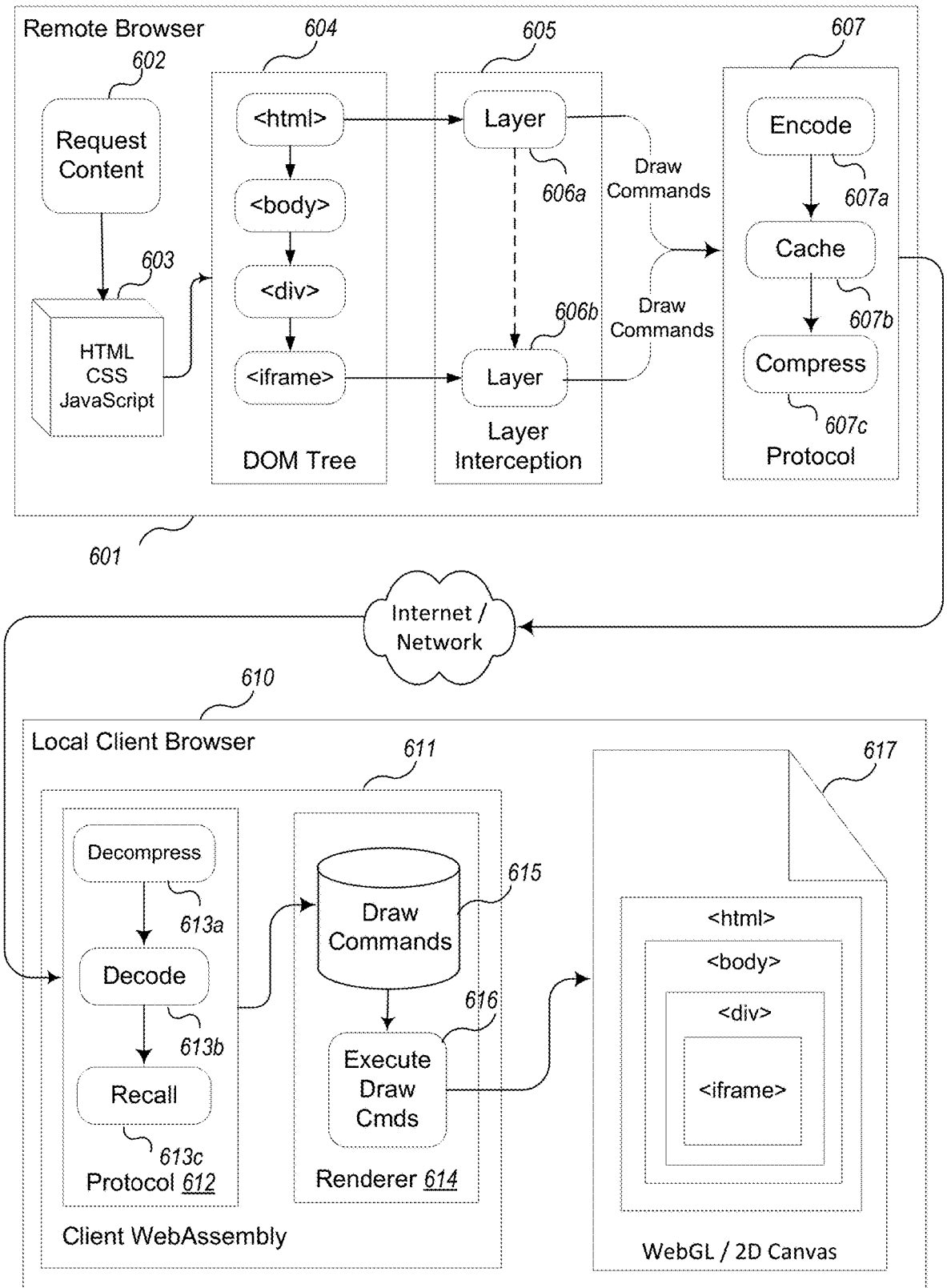
FIG. 6 is an example block diagram illustrating adapted web page data flow from an isolated web browser application to render a page on a corresponding rendering endpoint in an example Adaptive Rendering Application Isolation System.

For example, as described further with reference to FIGS. 5 and 6, in Chromium, the rendering output data may be captured before bitmaps are generated by the default Chromium rendering code. In one example ARAIS, the Chromium code is altered to capture the draw calls that relate to "tiles" that are being composited and would otherwise be rasterized (into pixels/bitmaps) and the draw calls for other regions (regions of outputs wherein the regions have predefined or dynamically defined shapes such as rectangles or others) (e.g., quads that are associated with or define rectangles) produced during compositing. These occur in response to "executing" the layers produced as a result of the compositing process (traversal of the DOM produces a layout tree which is traversed by the compositor to generate a layer tree and ultimately a display list) to generate regions (e.g., quads) to be painted and then rasterized. Interception alterations are made to the default rendering pipeline to extract draw commands that correspond to the portions of the page that would otherwise be rasterized. This type of interception results in a system that can forward packets of drawing commands (high level of graphics interception) instead of pixel pushing. Other configurations can yield other optimizations and advantages.

Secure container 300 also contains a cache 308, which can store for example draw commands on a per user (or per client browser) basis for frequently accessed content, the initial site visited (the home page), and other frequently visited sites. In addition, the remote browser instance 302 may track resources that are cached on the corresponding client (local) browser, for example, by keeping copies in its own cache 308 or through other mechanisms. For example, the draw commands may cause the client browser to render one or more layers to a cache (e.g., a resource cache), with one or more portions of the cache being rendered on a display of the client device and one or more other portions of the cache not being rendered until one or more subsequent events, such as a user input command (for example, a scroll event). Examples of resources that may be rendered to the resource cache include textures, fonts, shapes, curves, draw commands, predefined combinations thereof, or others, as is apparent from this paragraph and the above and below paragraphs of this disclosure. As is also apparent from this paragraph and the above and below paragraphs of this disclosure, the resource cache facilitates the isolated remote application instance providing the client application smaller amounts of data than the resources themselves, such as identifiers that correspond to respective resources in the resource cache.

FIG. 3B is an example block diagram of an isolated remote application instance running in an example execution environment of an example Adaptive Rendering Application Isolation System. Secure container 310 is similar to container 300, but contains one or more instances of remote application instances 311 depending upon the level of security between applications desired. In some cases, multiple threads 313 and 315 of the application instance 311 run in the same secure container 311. In other cases, each thread 313 and 315 is instantiated in its own secure container 311. The level of graphics interception and the various components of the graphics rendering pipelines are not shown as they could vary significantly from application to application. Techniques for such determination are described with reference to FIGS. 7 and 8. Secure container 310 also can contain a per user/per client cache 316 similar to that described for cache 308, but not specific to web based applications. Cache 316 may contain frequently used application resources for example.

Figure 4:
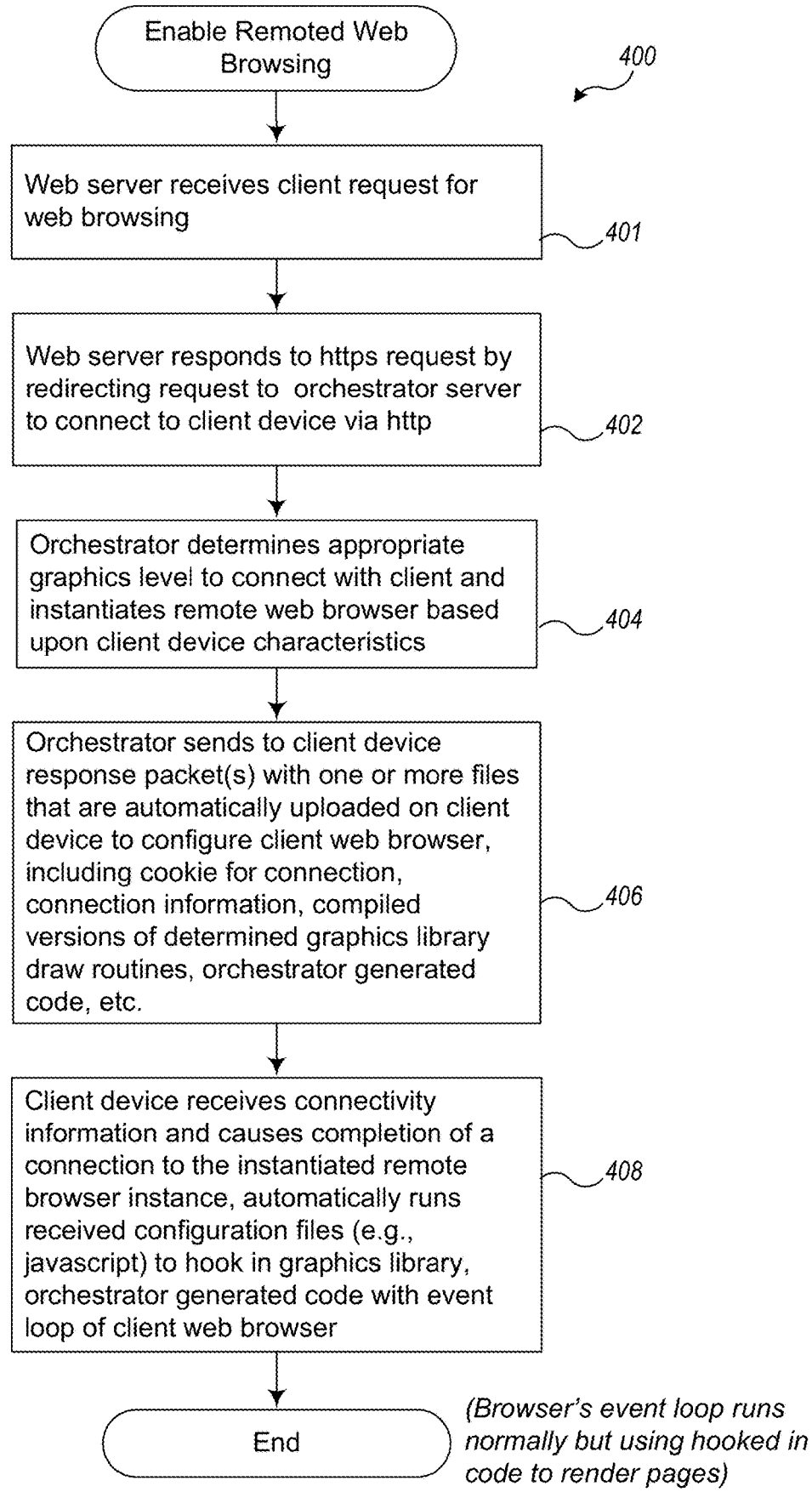
FIG. 4 is an example overview flow diagram of the logic for enabling an isolated remote web browser session using an example Adaptive Rendering Application Isolation System.

FIG. 4 is an example overview flow diagram of the logic for enabling an isolated remote web browser session using an example Adaptive Rendering Application Isolation System. In block 401, a web server (for example, Web Server 101) receives a client request for web browsing from a client computing device (for example, one of client computing devices 104*a*-104*d*). The request is preferably an HTTPS request. The request may be initiated by the user visiting or logging into a particular web page that transmits or forwards the request to the web server. For example, an administrator associated with the client computing device (also referred to as an endpoint) may configure settings associated with a network on which the client computing device resides to automatically redirect browsing requests to the web server. The request typically includes one or more of: a URL associated with a web page that the user intends to browse, an indicator of an operating system of the client computing device, an indicator of a type of browser or other application through which the user initiated the request, an indicator of a current status or state of one or more caches on the client computing device or content in the one or more caches (for example, a resource cache or others), an indicator (e.g., a cookie) that identifies whether the user or client computing device is associated with one or more browsing sessions contemporaneously executed on the web server or previously executed on the web server and now terminated, or an indicator of one or more portions of settings or configuration information of the client computing device, the browser or another application on the client computing device, or the network in which the client computing device resides (for example, IT network administrator settings or configurations).

In block 402, the web server (such as Web Server 101), using load balancer 106, redirects the HTTPS request to an orchestrator server (such as Remoting Orchestrator 102) to respond to the client computing device's request for the web page via HTTP. The load balancer typically converts the HTTPS request to HTTP to communicate with the orchestrator server.

In block 404, the orchestrator server determines the appropriate graphics level to use for transporting rendering data to the client computing device (see, for example, FIG. 7) and instantiates a remote web browser application in a secure container (such as secure containers 206*a-c*) based upon one or more characteristics of the client computing device (for example, the client operating system, client application or version, network settings or configurations enforced by an IT network administrator for the network in which the client computing device resides, bandwidth of the connection with the client computing device, or others). The characteristics may be based on one or more portions of the request. For example, the orchestrator may determine a browser type or browser version of the client web browser application and may instantiate a remote web browser application that is the same browser type or version. As another example, the orchestrator may determine an operating system of the client computing device and may instantiate the container used to execute the remote web browser application based on the same operating system. Further examples include determining a graphics library type or version employed by the client web browser application or a state of a cached library on the client computing device and using these characteristics to instantiate the remote web browser application in the secure container. As is apparent from this paragraph and the above and below paragraphs of this disclosure, the local cached library may include various resources such as textures, fonts, shapes, curves, draw commands, predefined combinations thereof, or others. As is also apparent from this paragraph and the above and below paragraphs of this disclosure, the local cached library facilitates the isolated remote application instance providing the client application smaller amounts of data than the resources themselves, such as identifiers that correspond to respective resources in the local cached library. A local cached library or a resource cache may be reusable across different domains, isolated application instances, or applications or may be specific to a particular domain, isolated application instance, or application and unusable for different domains, isolated application instances, or applications. Local cached libraries and resource caches are preferably different in that resources are rendered to the resource caches (whether displayed or not), whereas commands to render the resources are stored in or identified by data stored in the local cached libraries. As is apparent from the disclosure in this paragraph and the above and below paragraphs, the teachings herein related to local cached libraries also disclose the same or similar teachings regarding resource caches, and the teachings herein related to resource caches also disclose the same or similar teachings regarding local cached libraries.

In block 406, the orchestrator sends to the client computing device via an existing secure connection (e.g., the established HTTPS connection between the client computing device and the load balancer) one or more response packets to the client request for the web page with one or more files or updates to the one or more files that are automatically integrated into the client web browser's standard code to configure the client web browser application through hooking, intercepting, code injection, etc., as described elsewhere. The one or more files typically include four objects: a JavaScript file, a rendering file such as a WebAssembly file (.wasm file), an HTML file, and a cookie. The JavaScript file typically is configured to interface with an application programming interface (API) of the client web browser application to cause the client web browser application to load and hook the rendering file into the event loop, is configured to intercept events from an event loop to listen for events associated with the client web browser application and invoke the draw handling code in the rendering file (for example, using callbacks from the browser's internal event loop), and is configured to initiate a secure connection (e.g., via WebRTC or other secure connection) from the client web browser application to the remote web browser application. The rendering (WebAssembly) file typically includes the draw handling code in a compiled instance of a graphics library of the remote web browser application. The compiled instance of the graphics library is typically configured to cause draw commands to be rendered in the same manner on the client web browser application as on the remote web browser application to ensure consistent rendering on the client web browser application and on the remote web browser application. The HTML file is typically configured to cause the client web browser application to generate a drawing canvas, which if it incorporates HTML5, may interface to one or more GPUs. The cookie typically includes connection information to facilitate persistent remote browsing sessions with intermittent terminations of the connection (for example, shutting down the client computing device or closing the client web browser application and reconnecting to the same remote browsing session).

In other examples, one or more portions of the one or more files or updates may be embodied in one or more C++ files (and/or another programming language or file formats, such as JSON) that are provided to the client computing device to achieve the same or similar purposes. For example, the WebAssembly files may instead be provided as "asm.js" files using different tools to compile the respective drawing libraries for running on the client side. The orchestrator typically determines the one or more files or file updates based on one or more portions of the information evaluated or determined in one of the preceding blocks, such as block 404.

In block 408, the client computing device receives connectivity information and causes completion of a connection to the instantiated remote browser application (for example, the client may engage in a WebSocket exchange via the web server, including passing one or more private keys, to establish a WebRTC connection with the remote application instance), automatically runs received configuration files to hook in one or more graphics libraries in the client browser application, and automatically runs code generated by the orchestrator using an event loop of the client web browser application. The connectivity information is typically included in the one or more files or updates. The JavaScript file typically causes the client web browser application to pass events detected by the event loop of the client web browser application to the remote web browser application as messages. Examples of such events may include cursor movement, click events, keyboard events, scrolling events, or other user or browser actions.

After the one or more files or updates are loaded in the client computing device, the client web browser application is configured to rasterize visual output of the remote web browser application based on draw commands received from the remote web browser application without bitmap rasterizations of the draw commands. Accordingly, the user of the client computing device has a local browsing experience (low latency and low or zero artifacts) while the client computing device is completely isolated from malicious code associated with content loaded in the remote web browser application. In this manner, the process 400 provides the user experience benefits of DOM mirroring and the security benefits of pixel pushing, without the drawbacks of either of those approaches.

FIG. 5 is an example block diagram illustrating remote side code interception for adapting content in an isolated web browser application for delivery as draw commands to a corresponding rendering endpoint in an example Adaptive Rendering Application Isolation System. Block 500 represents modules of code logic in the standard (unmodified) Chromium rendering process to show one way to intercept draw commands at a high level of interception in the graphics pipeline. Because Chromium is open source, the rendering pipeline can be modified to accommodate the determined interception and remoting performed by ARAIS. Similar modifications can be made to any web-based application for which source code is available, although the logic and places for interception in the web-based application may vary and may be tuned for that application.

According to its standard behavior, Chromium separates a web page into a set of layers, that are traversed to eventually generate what is drawn on the screen. It uses SKIA as its software rendering library, which contains commands for vector based drawing. These layers are generally parts of the page that are separate—transformations on one do not typically effect the other. Title bars, scroll bar regions, sidebars, etc. are examples of this. Multiple types of layers exist, such as picture layer 510 and other layers 512. During compositing, each layer is processed by its own logic and thus may perform different behaviors and is responsible for producing regions (e.g., "quads" which are rectangles) ultimately rendered to a display device (using for example a GPU and associate graphics library like OpenGL) in a final position relative to the page. For example, the execution of the picture layer, typically eventually produces "tiles", "tile regions", or "tile quads" (e.g., 256×256 rectangles, a type of quad) which are rasterized to bitmaps for easy display and reuse. The picture layer generally produces the most rendering code based upon vector draw commands. As another example, other layer 512 may be a video layer which is responsible for rendering and decoding video and produces video regions (e.g., quads). Another layer 512 may be a background, which is a solid color layer than results in rendering a solid color region (e.g., a solid color quad). The regions (e.g., quads) corresponding to the layers are typically rendered in "stacking" or z-order. The standard behavior of Chromium's picture layer processing code loses the drawing command information that resulted in the bitmaps to be rendered, once the bitmaps are created. As explained, remoting bitmaps can increase the size of data forwarded to a client application as well as cause additional latency.

Example ARAIS configurations of the remote Chromium web browser intercept the layer tree produced by Chromium in one or more locations so as to capture all of the draw commands used to render the page. These commands are then potentially optimized, enhanced, encoded, augmented, compressed, etc. and forwarded using a secure connection (e.g., connection 120) to the location browser application. Typically, it is desirable that the remote web browser performs as much of the rendering work as possible for laying out the page (e.g., determining where text, images, etc. are located on the page—this includes, but is not limited to, measuring the area a block of text takes based on its font and text size). The browser's rendering path may be completed all the way up to the point where the web page is going to be drawn on the screen. This avoids incompatibility issues because the page is just drawn on the local web browsers based on the layout as calculated by the remote browser.

In the configuration illustrated in FIG. 5, block 500 shows interception at the picture layer 510 and generally for other regions 514 (e.g., other quads) to extract the draw commands at the generation of TileDrawRegion 506 (e.g., TileDrawQuad) and in the generation of other quads 514 into extracted draw commands 516. In some cases, one or more of the other quads 514 correspond to a cursor. In other cases, the isolated application instance is devoid of any cursors. The draw commands that are intercepted in block 506 are those that correspond to tiles being rendered—it is not all of the draw commands in the DisplayItemList. Other configurations may instead extract and forward the entire or a different portion of the DisplayItemList to the client browser. In one example configuration, the code for Draw Tile to Bitmap 508 is eliminated or altered to avoid the sending of the TileRegions (e.g., TileQuads) to the GPU for rasterization. This alternative may result in memory and speed optimizations and thus lower latency in responding to the client.

In Chromium, interception can occur in a variety of ways, for example, by hooking messages called between the layers and, for example, by modifying code (such as when LayerTreeHost calls CalculateRender Passes and in the AppendRegions (e.g., AppendQuads) code for each layer 502). Interceptions can also be made at other points in the code, in one or more portions or without preventing the rasterization of tiles to bitmaps. For example, instead of extracting the draw commands during the compositing process, they could instead be extracted prior to compositing and the work to perform compositing done on the client side. This would result in less compute time for the remote browser, but would require compilation of more of the rendering pipeline code placed into the (WebAssembly) file delivered to the client side browser to remote-enable the browser. Additional optimizations may be made to the modified rendering pipeline described for Chromium. For example, the layers produced by Chromium could be divided into smaller portions, and extracting draw commands corresponding to only the portions that are currently visible.

Similar techniques to that described also may be used with other web browsers. For example Safari's browsing engine uses the WebKit renderer which makes calls to the Cairo vector rendering library. These drawing calls could be intercepted in a similar manner to that shown in FIG. 5.

FIG. 6 is an example block diagram illustrating adapted web page data flow from an isolated web browser application to render a page on a corresponding rendering endpoint in an example Adaptive Rendering Application Isolation System. As shown and discussed with respect to FIG. 1, remote browser 601 is connected to and communicates with local client browser 610 over a secure connection (such as secure connection 120). After the local browser 610 has been remote-enabled and become isolation-ready through the integration of compiled code received from the orchestrator server (e.g., server 102), for example, in the form of a WebAssembly file, then input to the client device, such as such as keystrokes, mouse and other cursor and input events, can be captured from the standard browser input calls by "registering" callbacks (event listeners) into the delivered compiled code for these input events. The receipt of such event information (e.g., key value, mouse position, etc.) is then forwarded by the integrated code to the remote browser 601 across the secure connection. The remote browser 601 then performs whatever actions are necessary based upon the received input and renders output data.

Additionally, the remote browser 601 could also look for other relevant input events when it is aware of the structure of the page, for example, by having access to the DOM tree. In this case, the remote browser 601 could hook into code right before button input is processed. For example, the remote browser 601 could perform specialized actions upon receiving notification that the submit button (on a form) is depressed and provide a before-processing hook or an after-processing hook as desired.

The blocks of FIG. 6 illustrate how the process of rendering output by the remote browser 601 is modified and transmitted back to the local browser 610 to be handled by the integrated (WebAssembly) code 611 which is then rendered to a canvas, such as the WebGL canvas 614. The WebGL canvas 614 also be provided to the local browser when it is being remote-enabled by the web server. HTML5 canvases have the added benefit of being able to incorporate GPU acceleration.

Specifically, in block 602, while executing a page, a request for content is made by the remote browser 601. This content is typically received, for example by a third party content provide (e.g., based upon a URL) such as third party website 130 in the form of HTML, CSS, or Javascript 603. The remote browser 601, in block 604 builds the DOM tree for the received content through its normal processing and produces a series of layers 606a-b. In one example remote browser 601, the layer code for layers 606a-b is intercepted, as described above with respect to FIG. 5, to extract draw commands for what is to be rendered based upon the content and potentially the current viewport (what is currently visible). These draw commands correspond to the regions (e.g., quads) that would normally be rasterized and sent as bitmaps to the local browser 610 if one were to use pixel pushing technology. The remote browser 601 then potentially encodes the rendering output (the draw commands for regions such as quads to be rendered) in block 607a, caches desired encoded rendering output in block 607b, and compresses the encoded output in block 607c. This encoding, caching, and/or compressing can be performed according to a protocol 607 to be used to transport the rendered output across the secure connection.

In some example remote browsers 601, this protocol is proprietary. Other example remote browsers 601 use known remoting marshalling and unmarshalling procedures and known ways to encode, optimize, and/or compress data. For example, one remote browser 601 uses Google Protocol Buffers to apply compression to the draw commands and uses gzip or other similar compression technique to minimize the size of the data being transmitted. Each draw command is embedded in a message that contains the minimal amount of data needed to replicate that draw command on the local browser 610. For example, images and fonts are only transferred once and stored in a cache identified by an identifier on both the remote and local computing systems. Thereafter, use of the font/image resource will be transmitted using only the identifier, and then recalled from the local browser's cache later. Identifying images and other content that is reused early in the remoting process allows for optimal compression and caching of content. Alternatively, images and other content may be transmitted to the local browser 610 in their original requested/downloaded form.

The corresponding protocol 612 on the local browser side 610 is also either a proprietary protocol or uses known remoting marshalling and unmarshalling procedures and known ways to decode, decompress, and/or recall data such as in blocks 613a-c. Specifically, a cache (for example, a resource cache or a local cached library) on the local browser 610 (not shown) stores resources, such as images, textures, fonts, shapes, curves, draw commands, predefined combinations thereof, or others, that are reusable. Once the local browser 610 receives an identifier in one of the decode and decompressed (and depacketized) messages, it can retrieve the corresponding cached item from its cache.

While a web page is loading, additional caching can occur. For example, items not immediately visible on the page on the local client that would be visible if the content is scrolled can be cached ahead of time to reduce latency when scrolling the page. This is possible because draw commands are sent for an entire layer (or multiple portions of a layer when the layer is subdivided), which is more than what is just viewable using current viewport settings. Other information can also be cached. In addition, scroll bars may be locally simulated on the local browser 610 to reduce perceived latency by modifying the unpacketized (and decoded/decompressed) draw commands 615 received by the rendering code in the local browser 610 to additionally draw the scrollbars with them. The local browser renderer 614 then executes the modified draw commands 616 using the standard browser's rendering code (or ARAIS code in the integrated Web Assembly code 611) to render composited draw commands 616 to the WebGL or other canvas 617. Further, because the remote browser in the described configuration has access to all of the draw commands, it can inject additional commands or modify existing commands in the draw command sequence. Other configurations may modify the draw commands in other manners.

The techniques described with respect to FIG. 6 may also be incorporated in remoting applications that are not web browser based. For example, proprietary protocols can also be constructed to handle draw calls at the highest-level rendering library available for libraries other than SKIA to optimize bandwidth. If an application, for example used GDI then instead of sending the pixels that GDI produces, the GDI commands could be packetized and transmitted in a smaller amount of data.

Figure 7:
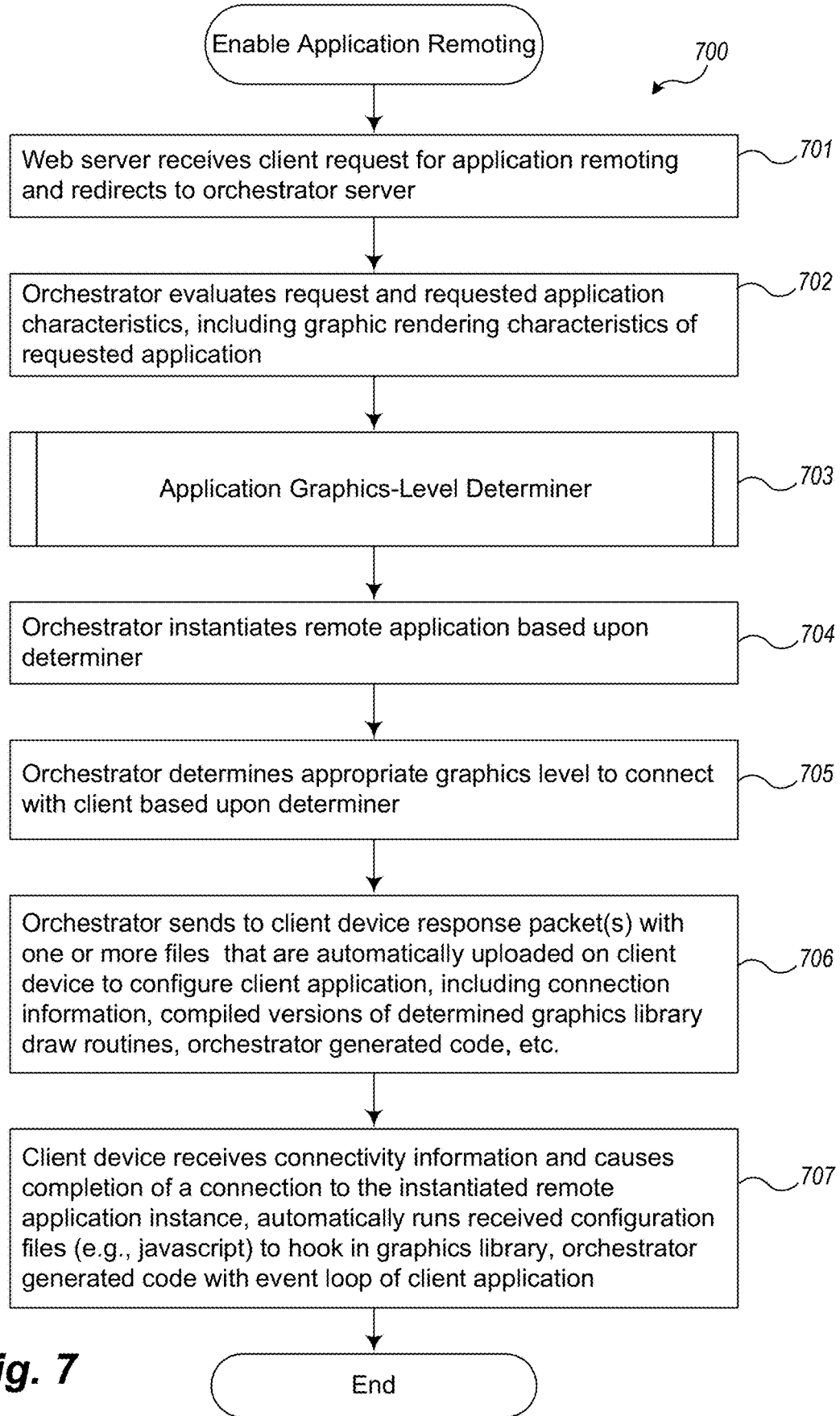
FIG. 7 is an example flow diagram of example logic provided logic for remote-enabling an isolated application using an example Adaptive Rendering Application Isolation System.

FIG. 7 is an example flow diagram of an example logic provided by an example Adaptive Rendering Application Isolation System to determine a level of data transfers and injection techniques for an application to be isolation-ready. This logic may be employed for all applications and not just web-based applications.

In block 701, a web server (for example, web server 101) receives a client request for application remoting from a client computing device (for example, one of client computing devices 104a-104d). The request typically includes one or more of the same or similar indicators as described regarding block 401 of process 400, including one or more of an indicator of an application or application type that the user intends to use or an indicator of an application or application type through which the user initiated the request. Also in block 701, the client request is redirected to an orchestrator server (such as orchestrating server 102) to respond to the client computing device's request for application remoting. The redirection is typically performed in the same or similar manner as described regarding block 402 of process 400.

In block 702, the orchestrator evaluates characteristics of the request and characteristics of the requested application. The request may include one or more characteristic indications, such as the application or application type that the client computing device intends to use to display the local rendering, the operating system of the client computing device, or one or more graphics engines or libraries included in or cached by the client computing device or the local rendering application. The request may also identify the application or application type that the user intends to remote. The application characteristics may include one or more indications, such as the identity of one or more applications or application versions available for the requested application or application type, one or more graphics engines or libraries included in each of those applications or application versions, whether those applications or application versions (or their graphics engines or libraries) are open source, or whether alternative graphics engines or libraries are compatible with those applications or versions or can be mapped to the graphics engines or libraries of those applications or versions. In some cases, the requested application may have previously been remoted by the ARAIS or may have been manually evaluated, and a data object (for example, a table) may include indicators of one or more of the application characteristics.

In other cases, the requested application may not have been previously remoted by the ARAIS, and, optionally, the request may include an executable file to install the application or may include an indicator of a location from which the ARAIS may retrieve the application, such as a URL. In those cases, the evaluation of the application characteristics can be performed in real-time. For example, the application may be installed in the remote environment, and a rules engine may execute rules to inspect the application files, APIs, or source or object code (for example, machine learning tools can crawl the accessible code or libraries, implementing guess-and-check attempts to hook into one or more portions of the files or code, recognizing file or code module names, or implementing other inspection techniques) to dynamically discover application characteristics. The determined characteristics may then be stored for future use by the ARAIS. If application characteristics are unavailable or unsuccessfully determined, default characteristics may be used until the application is manually inspected and the discovered characteristics used to overwrite the default characteristics. For example, if the graphics library or engine of the requested application is not accessible in real time, an equivalent or lower-level graphics library or engine may instead be used (either the highest-level engine or library accessible for the application or, if that is not accessible, an operating system level library or engine).

Figure 8:
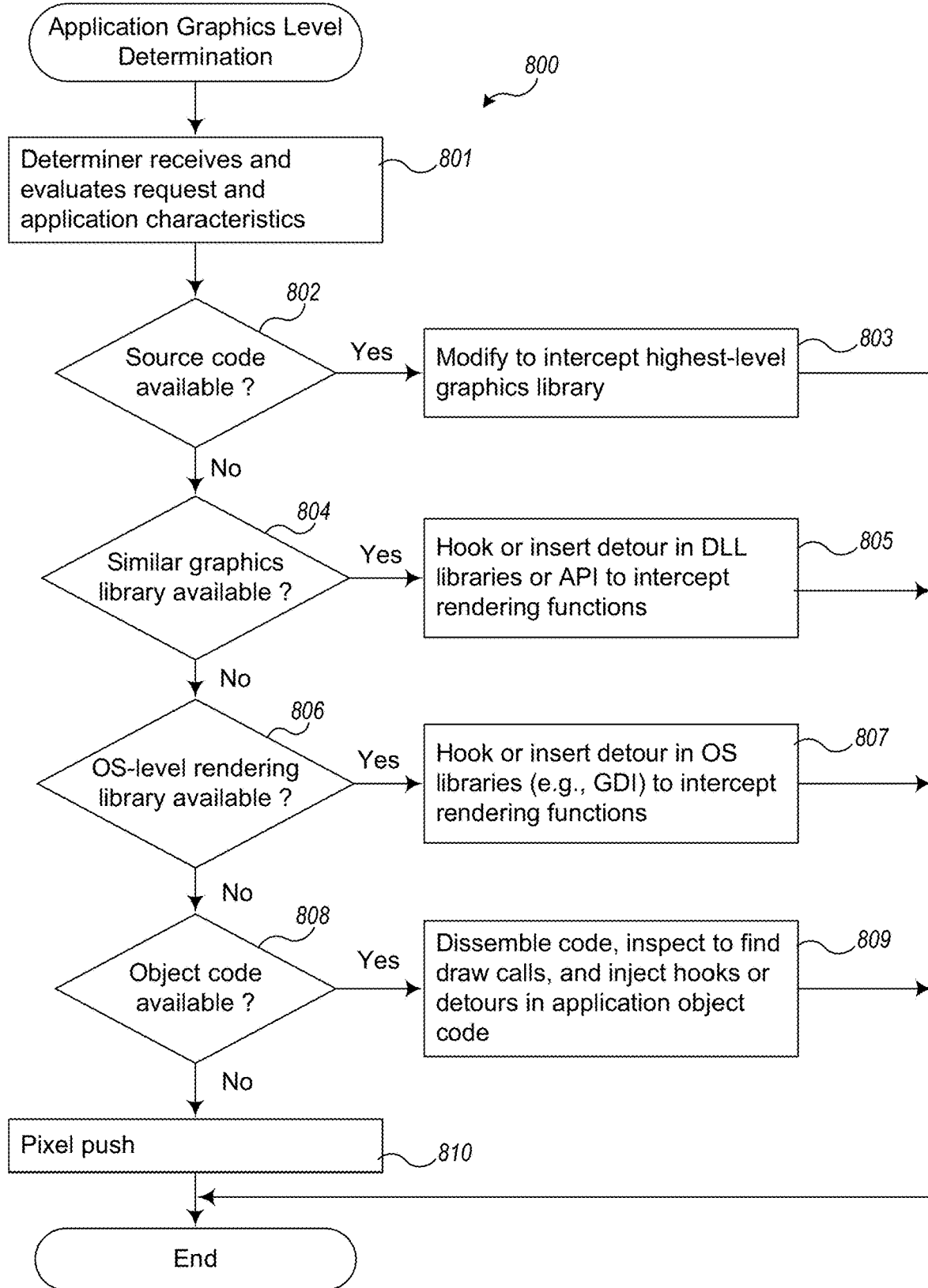
FIG. 8 is an example flow diagram of example logic provided by an example Adaptive Rendering Application Isolation System to determine a level of data transfers and injection techniques for an application to be isolation-ready.

In block 703, logic flows to the application graphics-level determiner to determine the appropriate graphics level to connect with client, as further described with regard to FIG. 8 because different applications may have different characteristics. For example, applications based on Chromium (for example, a Chrome browser application or Electron applications) or applications that employ SKIA libraries (for example, Chromium applications, Electron applications, or Android applications) typically have source code available (they are open source) with similar rendering architectures, whereas enterprise applications may have different rendering architectures (for example, Adobe Air applications use Flash for rendering, Adobe Acrobat uses a proprietary vector library for rendering, and Microsoft Office and Others use GDI for rendering). Accordingly, the mechanisms used to intercept calls and which files to generate and provide to configure the client application for application remoting may vary from application to application.

Generally, the highest-level rendering library within an application is preferably identified, accessed, and modified to include hooks or detours that facilitate intercepting draw commands and corresponding position information associated with that library. Examples of high-level graphics libraries include SKIA, CAIRO, and GDI, which are used by applications with Chromium, Mozilla, WebKit, or other engines. Within high-level graphics libraries, libraries based on vector-commands (for example, SKIA) are preferred over libraries based on commands that lose vector information (for example, GDI) because employing the vector libraries are less likely to result in intercepting rendering commands that involve pixel information, generally use less bandwidth, and generally cause less latency issues.

In block 704, the orchestrator instantiates a remote application in a secure container (such as container 103) based upon one or more portions of the request. One or more portions of block 704 are typically performed in the same or similar manner as described regarding block 403 of process 400. Before or when instantiating the remote application, actions are taken to obtain render commands and corresponding position information to facilitate providing such information to the client computing device based on the determinations of the application graphics-level determiner. One or more files, engines, or code modules are typically injected into or replace one or more portions of one or more files associated with the remote application to facilitate the determined manner of interception. For example, for open source engines or libraries, the code is typically injected into those engines or libraries as determined in block 703 to facilitate interception of the highest-level draw commands.

In block 705, the orchestrator determines the appropriate graphics level to connect with the client based on the determinations made by the application graphics-level determiner in block 703. One or more portions of block 705 are typically performed in the same or similar manner as described regarding block 404 and 405 of process 400. Typically, the highest-level appropriate library determined in block 703 is compiled (for example, as a WebAssembly file or asm.js file for browser applications that do not support WebAssembly, such as IE11) for use in rendering the intercepted commands (on the client side) unless pixel pushing is the only option. In some cases, where the graphics commands (for example, draw commands) in the highest-level appropriate library have been mapped to another library, the other library may be compiled for use in rendering the intercepted commands. For example, the remoted application, its graphics engine, or its graphics library may not be compatible with the local rendering environment (for example, the client computing device or the application or application type through which the user initiated the request) while the other library is compatible; the intercepted commands may be translated to the mapped commands in the other library (one to one, one to many, many to one, or many to many mapping); the other library may be compiled; and the mapped commands may be provided to the client computing device for use with the other compiled library. In some cases, the client computing device may already have the appropriate library files, and an update to the appropriate library files may be compiled.

In block 706, the orchestrator sends to the client computing device one or more response packets with the files or updates to the files. These files are automatically uploaded on the client computing device to configure the client application to perform the rendering process based on the one or more intercepted graphics commands, when it is possible to intercept them. One or more portions of block 706 are typically performed in the same or similar manner as described regarding block 406 of process 400. As with block 406 of process 400, the files may include compiled libraries of draw commands, sequences of draw commands (for example, stored procedures), or bitmaps that can be cached on the client computing device to facilitate rendering output from the remote application instance by sending identifiers that are logically associated with those draw commands, sequences of draw commands (for example, stored procedures), or bitmaps.

In block 706, the client computing device receives connectivity information and causes completion of a connection to the instantiated remote application, automatically runs received configuration files to hook in one or more graphics libraries to the local application's event loop, and automatically runs code generated by the orchestrator. One or more portions of block 706 are typically performed in the same or similar manner as described regarding block 408 of process 400; however not all applications have an accessible event loop or an event registration system, and other mechanisms for hooking in the rendering code may be needed such as by injection after inspection of the application. Blocks 705-707 may vary based on one or more of the client characteristics, such as the types of connections that the client computing device supports. The architecture described in FIG. 1 can be applied directly to Electron applications, for example.

After the files or updates are loaded in the client computing device, the client application is configured to render visual output of the remote application instance based on draw commands received from the remote application instance without receiving bitmap rasterizations of the draw commands. Accordingly, the user of the client computing device has a local application experience (low latency and low or zero artifacts) while the client computing device is completely isolated from malicious code associated with content loaded in the remote application instance. In this manner, the process 700 provides the experience benefits of DOM mirroring and the security benefits of pixel pushing, without the drawbacks of either of those approaches. Moreover, the ARAIS can dynamically remote applications. The logic then ends.

FIG. 8 is an example flow diagram of an example logic provided by an example Adaptive Rendering Application Isolation System to determine a graphics level of data transmission and integration techniques for an application to be isolation-ready. In block 800, an application graphics level determiner (for example, the remoting level determination logic and rules engine 201 or attribute and rules determiner 301) receives and evaluates characteristics of a client computing device's request (transparently or explicitly initiated) to remote an application and also receives characteristics of the requested remote application. The receipt and evaluation of the characteristics is typically performed in the same or similar manner as described regarding blocks 701 and 702 of process 700. Based on the evaluated characteristics of the request or the remote application, a manner of intercepting graphics information is determined to provide the highest level of interception based on the outcomes of decision blocks 802, 804, 806, and 808. One reason for attempting to intercept at the highest level of graphics is let allow the native application code on the client side to perform the details of the rendering yet transmit the lowest amount of data across the wire. This also typically results in less latency.

In block 802, the logic determines whether the source code of the remote application is available and, if so, continues to block 803, otherwise continues to block 804. In some examples, the remote application is open source or publicly available by other means. In other examples, at least a portion of the source code has been available through other mechanisms, such as a licensing agreement or an API.

In block 803, the graphics engines or libraries can be directly inspected or modified, and the highest-level graphics library of the remote application is modified to intercept and output called draw commands and corresponding position information to facilitate providing (forwarding, transmitting, sending, etc.) those draw commands to the client computing device. For example, draw commands for the application's highest-level library can be intercepted when executing the remote application instance, and the remote application can be modified to prevent rasterization of pixels to reduce expensive computations while still obtaining position information for the intercepted draw commands.

In block 804, the logic determines whether the graphics libraries of the remote application are unavailable yet one or more graphics libraries that are similar to one or more of the graphics libraries of the remote application are available and, if so, continues to block 805, otherwise continues to block 806. For example, a graphics library of the remote application may not be available, yet an open-source graphics library that is similar to the unavailable graphics library may be available. In some cases this assessment can be performed manually, yet in other it can be performed automatically by the computer, or a combination of manual and automated search for similar libraries can be performed.

In block 805, hooks or detours are placed in the remote application's dynamic link library (DLL) or other shared library files to intercept the remote application instance's rendering functions. In some cases, an open-source or custom-built equivalent engine or library can be implemented and used based on the intercepted rendering functions to facilitate intercepting draw commands and corresponding position information.

In block 806, the logic determines whether an operating-system-level rendering library is available (such as those used to remote desktop applications) and, if so, continues to block 807, otherwise continues to block 808. In some cases, an OS-level rendering library is always available. In other cases, the logic may determine that the OS-level rendering library is unavailable for the remote application based on its characteristics, such as output type, or based on the client characteristics, such as the client computing device having an operating system with rendering libraries that have not been mapped to the rendering libraries of the remote OS.

In block 807, hooks or detours are placed in one or more OS libraries (for example, a GDI library) or emulated OS libraries (for example, libgdiplus) to facilitate intercepting rendering functions. In some cases, an open-source or custom-built equivalent engine or library can be implemented and used based on the intercepted rendering functions to facilitate intercepting draw commands and corresponding position information.

In block 808, the logic determines whether object code for the remote application is available and, if so, continues to block 809, otherwise continues to block 810. In some cases, the application object code can be dissembled and inspected (manually, automatically, or both) to find draw calls in the dissembled object code.

In block 809, the dissembled object code is inspected in the same or similar manner as discussed with regard to block 702 of process 700. Hooks or detours can be injected in the application object code to facilitate intercepting draw commands and corresponding position information.

Finally, when no other options are available, in block 810, pixel pushing is implemented. For web based applications like SKIA, a renderer's compositor is essentially using the GPU to draw rectangular areas of the remote application output (e.g., all compositing layers, positioned relative to the viewport according to a layer tree's transform hierarchy) into a single bitmap, and the bitmap is captured as pixel information that can be passed to the client computing device. For other applications, for example those that use hardware rendering, transmitting the pixels may be the only option, The logic then ends.

Although the decision blocks are shown as being in a serial logic flow, they can be executed in parallel. In some cases, the logic evaluates the effectiveness of the action blocks 803, 805, 807, 809, and 810 that correspond to the positively satisfied decision blocks based on one or more of the client characteristics or remote application characteristics. The logic may execute rules or thresholds to evaluate performance data measured for the client computing device or the remote application for each of the evaluated action blocks to determine the effectiveness of the corresponding techniques and to determine an appropriate level for rendering interception.

For example, the determiner may determine that, based on the client computing device's operating system, local rendering environment, physical characteristics, or connection characteristics (e.g., bandwidth), one of the evaluated action blocks may provide superior results to one or more other evaluated action blocks. Some of the considerations that the logic evaluates to select one of the available blocks include pros and cons of each of the evaluated action blocks and their associated techniques. For example, intercepting the highest-level graphics library by inspection and modification of available source code is typically the ideal technique because of the benefits explained throughout this disclosure, without the drawbacks associated with and described for the other techniques. Breaking down an application's high-level drawing library and extracting the draw calls from the deconstructed library is unconventional, not well known, and not routine, as evidenced at least by the lack of competing products currently in the market using this technique. Transmission and/or compression of vector draw commands is also unconventional, not well known, and not routine.

Intercepting draw commands by hooking a process or otherwise using injection or detour techniques has a benefit of not requiring modification of source code of the remote application. However, these techniques can be challenging to maintain without compromising security. Hooks are typically made at the application level (for example, hooking drawRect in SKIA) and involve creating an external shared library (for example, .so file), forcibly loading the code into the executable of the remote application, and then rewriting the remote application's compiled call to the hooked call, and redirecting it to code that facilitates intercepting the call. The hooks will periodically break as the remote application is updated by the author or provider of the remote application. Injection of code involves rewriting compiled assembly (typically function calls) to redirect to another location, and the assembly is rewritten after loading, making it difficult to verify that all paths result in proper remote application behavior. Tools typically used to catch security flaws (for example, linters or static analyzers) cannot be easily run at the assembly level because this technique overwrites compiled code, and these tools typically run on source code, not overwritten assembly code. This leaves the potential for any modification to introduce a crash or a potential exploit.

Intercepting and providing intermediate render commands (for example, underlying OpenGL, WebGL, DirectX, Vulkan, or other render commands), rather than the highest-level draw commands within the remote application, has a benefit of being at a higher level than pixels and facilitates improved compression relative to pixels. However, intermediate render commands are at a lower level than vector rendering and, thus, will lose some information. For example, curves are lost because they are typically translated into a series of vertices and combined with compiled shaders to draw the curves. The compiled shaders and vertices are larger in data size than the original curves. Moreover, images need to be decompressed and put into a specific format that is consumable by the GPU, losing original information and compression.

Intercepting and providing operating-system level calls also do not require modifying source code of the remote application. However, because calls at this level are at a lower level than the highest-level draw commands within the remote application, some information is lost. This results in compressing images, damaged or dirty rectangles, and viewports of individual layers. For example, GDI often works with pixel data, and using SKIA to draw to a surface with GDI results in a loss of the SKIA vector information, which eliminates lossless scaling and requires more data to transmit the intercepted rendering command. Moreover, GDI is an optimization only on platforms available under the mark WINDOWS, unlike intercepted vector draw commands, which can be platform agnostic.

Pixel pushing is the lowest level of each of these options and requires the most amount of data to be transmitted across the wire.

Based on one or more of the client characteristics, it may be determined that one of the evaluated action blocks provides an experience to the user that most closely matches the native client environment, results in faster rendering on the client computing device, transmits less information across the wire to render a given remote application output (for example, pixel pushing requires sending more information than draw commands, even with advanced video and tiling compression because draw commands have a smaller footprint), or has lower latency (time due to computation or transmission of a given amount of data at a given bandwidth). An example of reducing computational latency is employing high-level draw commands over pixel pushing because this avoids video decoding and algorithms used for video smoothing (for example, jitter buffers), which in turn reduces client-side computations and facilitates less time consumption by the client computing device to display the remote application instance output.

Based on one or more of the remote application characteristics, it may be determined that one of the evaluated action blocks provides performance improvements on the server side, as compared to one or more of the other evaluated action blocks. For example, block 803 facilitates leveraging existing code (for example, code that provides the standard rendering process in the engine of the remote application, such as Chromium). Block 803 also facilitates compiling using rendering technology for the web (for example, WebAssembly or JavaScript). Hooking in at different levels in block 805 facilitates evaluating tradeoffs for different purposes, such as evaluating render commands, determining library level, and the like. Enterprise applications may use many frameworks (for example, ws widgets, Windows Presentation Foundation (WPF), or others), which may require hooking into rendering code at a lower level, which may require more computational resources than other techniques. Some applications record a screen and do not necessarily invoke a graphics library at all, leaving block 810 as the only appropriate option. Accordingly, the user's experience can be optimized based on characteristics of the remote application and the client computing device while providing increased levels of security.

The hooking of interception code described in the logic of flow diagram 800 can be performed by a variety of possible known mechanisms, such as by callback mechanisms that take advantage of known or discovered architectures and attributes of the remote application; hooking known or discovered application programming interface ("API");

object code injection that replaces portions of the local application's executable code with a different portion of executable code; extending the remote application using known plug-in or extension mechanisms; dynamically linking in shared libraries; and the like. Each of these solutions may have advantages and disadvantages based upon how easy it is to integrate into the application to be remote-enabled. For example, injecting code typically involves rewriting compiled code to redirect function calls to another location (where alternative code sequence is defined).

Figure 9:
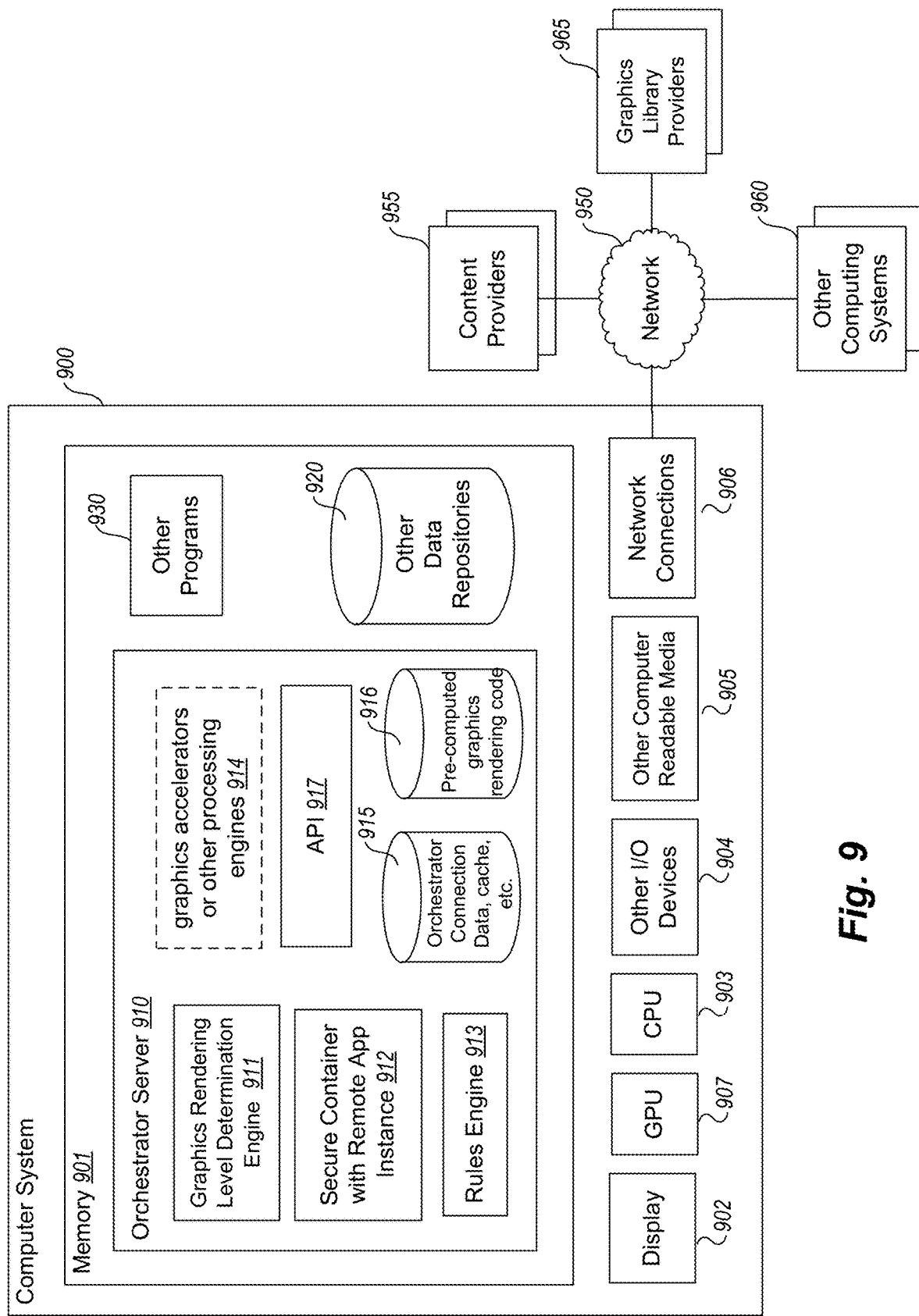
FIG. 9 is an example block diagram of an example computing system for practicing embodiments of an example Adaptive Rendering Application Isolation System as described herein.

FIG. 9 is an example block diagram of an example computing system for practicing embodiments of an example Adaptive Rendering Application Isolation System as described herein. In particular, this example computing system may be used to practice any one or more of the servers 101 and 102 or the client devices 104a-d illustrated in FIG. 1. Note that one or more general purpose virtual or physical computing systems suitably instructed or a special purpose computing system may be used to implement an ARAIS. Further, the ARAIS may be implemented in software, hardware, firmware, or in some combination to achieve the capabilities described herein.

Note that one or more general purpose or special purpose computing systems/devices may be used to implement the described techniques. However, just because it is possible to implement an Adaptive Rendering Application Isolation System or an isolation-enable application on a general purpose computing system does not mean that the techniques themselves or the operations required to implement the techniques are conventional or well known.

The computing system 900 may comprise one or more server and/or client computing systems and may span distributed locations. In addition, each block shown may represent one or more such blocks as appropriate to a specific embodiment or may be combined with other blocks. Moreover, the various blocks of the orchestrator server 910 may physically reside on one or more machines, which use standard (e.g., TCP/IP) or proprietary interprocess communication mechanisms to communicate with each other.

In the embodiment shown, computer system 900 comprises a computer memory ("memory") 901, a display 902, one or more Central Processing Units ("CPU") 903, Graphics Processing Units ("GPU") 907, Input/Output devices 904 (e.g., keyboard, mouse, CRT or LCD display, etc.), other computer-readable media 905, and one or more network connections 906. As an example of the computing system used to practice the orchestrator server of the ARAIS, the orchestrator server 910 is shown as an example component residing in memory 901. In other embodiments, some portion of the contents, some of, or all of the components of the orchestrator server 910 may be stored on and/or transmitted over the other computer-readable media 905. The components of the orchestrator server 910 preferably execute on one or more CPUs 903 and manage the isolation and remoting mechanism, as described herein. Other code or programs 930 and potentially other data repositories, such as data repository 920, also reside in the memory 901, and preferably execute on one or more CPUs 903. Of note, one or more of the components in FIG. 8 may not be present in any specific implementation. For example, some embodiments embedded in other software or solely used as a remote server may not provide means for end user input or display.

In a typical embodiment, the orchestrator server 910 includes one or more graphics rendering level determination engines 911, one or more secure containers with remote application instances running 912, one or more rules engines 913 for interfacing to the determination engines 911 and for other purposes, logic for handling the secure connections to client devices (not shown), connections logic for communication with the ARAIS web server (not shown), and graphics accelerators or other processing 914. In at least some embodiments, the graphics rendering level determination engine 911 and/or rules engine 913 is provided external to the ARAIS and is available, potentially, over one or more networks 950. In addition, data repositories 915 and 916 may be includes to hold connection data, a cache, and pre-computed graphics rendering code. These components/modules are described in detail with reference to FIG. 2. Other and/or different modules also may be implemented. In addition, the ARAIS may interact via a network 950 with third party websites or content 955 or graphics library providers 965 that provides content such as updated versions of libraries or other tools, and one or more other computing systems 960 within the ARAIS such as other server computing systems that are part of ARAIS. Also, of note, some portions of data repository 916 may be provided external to the ARAIS as well, for example accessible over one or more networks 950.

In an example embodiment, components/modules of the orchestrator server 910 are implemented using standard programming techniques. For example, the orchestrator server 910 may be implemented as a "native" executable running on the CPU 103, along with one or more static or dynamic libraries. In other embodiments, the orchestrator server 910 may be implemented as instructions processed by a virtual machine. A range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use well-known or proprietary, synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously and communicate using message passing techniques. Equivalent synchronous embodiments are also supported.

In addition, programming interfaces to the data stored as part of the orchestrator system 910 (e.g., in the data repositories 915 and 916) can be available by standard mechanisms such as through C, C++, C#, and Java APIs; libraries for accessing files, databases, or other data repositories; through scripting languages such as XML; or through Web servers, FTP servers, or other types of servers providing access to stored data as consistent with the security desired. For example, in a typical orchestrator server of an ARAIS, this data would not be accessible to any systems outside of the web server/load balancer 101/106. However, as used to represent a client computing system, other data may be visible to others by one of the mechanisms described (that is one of the reasons they are vulnerable to malicious attacks). The data repositories 915 and 916 may be implemented as one or more database systems, file systems, or any other technique for storing such information, or any combination of the above, including implementations using distributed computing techniques.

Also the example orchestrator server 910 and other server and/or client computing systems described herein may be implemented in a distributed environment comprising multiple, even heterogeneous, computer systems and networks. Different configurations and locations of programs and data are contemplated for use with techniques of described herein. In addition, the server and/or client may be physical or virtual computing systems and may reside on the same physical system. Also, one or more of the modules may themselves be distributed, pooled or otherwise grouped, such as for load balancing, reliability or security reasons. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, etc.), WebRTC, WebSockets, and the like. Other variations are possible. Also, other functionality could be provided by each component/module, or existing functionality could be distributed amongst the components/modules in different ways, yet still achieve the functions of an orchestrator server.

Although the Adaptive Rendering Application Isolation System ("ARAIS") is largely discussed in terms of its improvements to computer security, the ARAIS also facilitates improvements to computer technologies in many other ways, as is apparent from this disclosure. Examples include network scalability and computational scalability, preferably without changing the experience of the end-user (i.e., transparency). Other examples include data control, such as compliance. Compliance includes legal compliance (e.g., General Data Protection Regulation (GDPR) compliance or others), enterprise policy compliance, or others. The ARAIS also facilitates reducing technological costs (as opposed to economic costs), such as computation costs, storage costs, bandwidth costs, or others. Further examples include ensuring version consistency related to applications (for example, web browsers) executing in the cloud by ensuring that all remote application instances are updated to the same version or have implemented the same patches (e.g., security patches).

Regarding data control, traditional web browsers allow users to move whatever data the user desires to any location that the user selects. In contrast, the ARAIS facilitates controlling where data sits and flows based on the local application's interactions with the remoting orchestrator, remote application instance, or other components of the ARAIS. One example includes executing a remote web browser or another remote application such as OUTLOOK in the secure container, and the ARAIS prevents downloading all data or select data or types of data (for example, personally identifying information (PII) in emails) other than select types of information such as draw commands from or via the remote web browser or other remote application to the client device based on one or more rules. Further, an enterprise implementing or otherwise utilizing the ARAIS preferably has visibility or control over data to facilitate data loss prevention (DLP) based on executing one or more rules to prevent select information or information types from being sent out of or brought into the enterprise, such as executing one or more rules that prevent uploading computer-aided design (CAD) documents or files from being transmitted to a computing device that is not associated with or controlled by the enterprise (for example, a computing device that does not directly control a remote web browser or remote application in the ARAIS).

Regarding costs, traditional web browsers or other locally executed applications lack scalability (up or down). In contrast, the ARAIS facilitates computation scalability (e.g., compute scalability, such as central processing unit (CPU) and memory footprint scaling or others), storage scalability, and bandwidth scalability in a manner that is transparent both to the user and to the client device, thereby facilitating reducing the computational load on the client device because draw commands sent to the client computing device preferably do not materially influence the computational burden on the client device whether scaling up or down. Moreover, the ARAIS facilitates the remote orchestrator avoiding execution of a heavyweight virtual machine as is required in other remoting applications such as Remote Desktop Protocol applications or others. For example, the ARAIS facilitates merely executing an emulator instead of a virtual machine. Further, as explained elsewhere in this disclosure, various components of the remote browser instance or remote application instance may be distributed (for example, the execution computing device may be distributed and/or each function (e.g., scrolling or others) may be executed on a different machine) and all communicate with the client device or a single one of the machines in the distribution to communicate the draw commands to the client device such that the experience for the user and the client device is transparent.

Furthermore, in some embodiments, some or all of the components of the orchestrator server 910 may be implemented or provided in other manners, such as at least partially in firmware and/or hardware, including, but not limited to one or more application-specific integrated circuits (ASICs), standard integrated circuits, controllers executing appropriate instructions, and including microcontrollers and/or embedded controllers, field-programmable gate arrays (FPGAs), complex programmable logic devices (CPLDs), and the like. Some or all of the system components and/or data structures may also be stored as contents (e.g., as executable or other machine-readable software instructions or structured data) on a computer-readable medium (e.g., a hard disk; memory; network; other computer-readable medium; or other portable media article to be read by an appropriate drive or via an appropriate connection, such as a DVD or flash memory device) to enable the computer-readable medium to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

From the foregoing it will be appreciated that, although specific embodiments have been described herein for purposes of illustration, various modifications may be made without deviating from the spirit and scope of the invention. For example, the methods and systems for performing isolation-enabled rendering discussed herein are applicable to other architectures other than a Chromium or web-based architecture. Also, the methods and systems discussed herein are applicable to differing protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. A computer-implemented method for improving one or more computer technologies, comprising:
    under control of a rendering computing device that is remotely located, separate, and distinct from an execution computing device:
        providing to the execution computing device a request to initiate a remote application in the execution computing device while the rendering computing device executes an instance of a local application, the remote application instance having a compositor and a region renderer;
        responsive to the request, obtaining one or more files from the execution computing device;
        providing the one or more obtained files to the local application instance to facilitate the rendering computing device to display output of the remote application instance and to facilitate the local application instance to initiate a connection from the local application instance to the remote application instance and perform one or more of intercept events from an event loop to listen for events associated with the local application instance or generate a drawing canvas;
        initiating the connection from the local application instance to the remote application instance to cause the connected remote application instance to:
            intercept first draw commands from the compositor of the remote application instance, the first draw commands corresponding to one or more tiles to be rendered and representing only a portion of all draw commands used to provide a current output of the remote application instance;
            capture first position information from the region renderer of the remote application instance for the one or more tiles that correspond to the first draw commands; and
            intercept second draw commands from the region renderer of the remote application instance that correspond to one or more regions to be rendered and capture second position information for the one or more corresponding regions; and
        obtaining the first and second draw commands with the first and second captured position information from the remote application instance;
        rendering one or more portions of the output of the remote application instance based on the first and second draw commands and the first and second captured position information.

2. The method of claim 1 wherein rendering the one or more portions of the output of the remote application instance based on the first and second draw commands and the first and second captured position information includes rendering the one or more portions of the output of the remote application instance based on the first and second draw commands and the first and second captured position information without obtaining bitmap rasterizations of the first and second draw commands from the execution computing device.

3. The method of claim 1 wherein the local application instance renders one or more layers to a cache based on the first and second draw commands and the first and second captured position information obtained from the execution computing device, wherein one or more portions of the cache are rendered on a display of the rendering computing device based on a portion of the obtained first and second draw commands, and wherein one or more other portions of the cache are not rendered on the display of the rendering computing device concurrently with the one or more portions of the cache and are based on another portion of the received first and second draw commands.

4. The method of claim 3 wherein the cache includes one or more of an image cache, a texture cache, a font cache, a shape cache, a curve cache, or a draw command cache.

5. The method of claim 3 wherein, upon notification of a scrolling event or another event associated with a user action, the local application instance renders on the display of the rendering computing device some part of the one or more other portions of the cache without receiving further draw commands from the execution computing device.

6. The method of claim 1, further comprising:
    providing to the execution computing device one or more indicators of one or more characteristics of one or more of the local application instance or a data channel connecting the execution computing device and the rendering computing device;
    based on a determination of whether third draw commands associated with one or more portions of the current output facilitates higher performance than pixel information associated with the one or more portions of the current output based on an evaluation of the one or more characteristics, obtaining from the execution computing device whichever one of the third draw commands or the pixel information is determined to facilitate higher performance; and
    rendering one or more portions of the output of the remote application instance based on the obtained third draw commands or the obtained pixel information.

7. The method of claim 6 wherein the evaluation includes determining a data bandwidth and/or a latency and comparing the data bandwidth and/or the latency to one or more thresholds to determine whether the third draw commands or the pixel information facilitate higher performance.

8. A computer-implemented method for improving one or more computer technologies, comprising:
    under control of an output rendering computing device that is remotely located, separate, and distinct from a code execution computing device:
        providing to the code execution computing device a request to initiate a remote application in the code execution computing device while the output rendering computing device executes an instance of a local application, the remote application instance having a compositor and a region renderer, the request indicating an operating system of the output rendering computing device and an application type of the local application, the remote application instance having a current compositor, a current region renderer, or a current graphics library determined based on one or more of the operating system of the output rendering computing device and/or the application type of the local application in the output rendering computing device;
        responsive to the request, obtaining a set of files from the code execution computing device, the set of files being determined based on the request and the one or more of the current compositor, the current region renderer, or the current graphics library, the set of files containing compiled draw commands and information that modifies the local application instance to display output of the remote application instance;

providing the set of files to the local application instance to facilitate the output rendering computing device to display output of the remote application instance, wherein one or more files in the set of files is configured to interface with an application programming interface ("API") of the local application instance to cause the local application instance to load one or more files in the set of files, is configured to intercept events from an event loop to listen for events associated with the local application instance and invoke draw handling code, and is configured to initiate a connection from the local application instance to the remote application instance, wherein one or more files in the set of files includes the draw handling code in a compiled instance of a graphics library of the remote application instance, the compiled instance of the graphics library being configured to cause draw commands to be rendered in the same manner on the local application instance as on the remote application instance to facilitate consistent rendering on the local application instance and on the remote application instance, and wherein one or more files in the set of files is configured to cause the local application instance to generate a drawing canvas;

causing a connection between the remote application instance and the local application instance to facilitate the output rendering computing device to display the output of the remote application instance;

obtaining draw commands from the connected remote application instance; and rendering one or more portions of the output of the remote application instance based on the obtained draw commands.

9. The method of claim 8 wherein the set of files include a script file, a rendering support file, and a canvas file, the script file being configured to (i) interface with the API of the local application instance, (ii) intercept events from the event loop, and (iii) initiate the connection from the local application instance to the remote application instance, the rendering support file including the draw handling code, and the canvas file being configured to cause the local application instance to generate the drawing canvas.

10. The method of claim 8 wherein one or more files in the set of files is configured to cause the local application instance to render one or more layers to a cache based on the draw commands received from the execution computing device, wherein one or more portions of the cache are caused to be rendered on a display of the rendering computing device based on a portion of the received draw commands, and wherein one or more other portions of the cache are not rendered on the display of the output rendering computing device concurrently with the one or more portions of the cache and are based on another portion of the received draw commands.

11. The method of claim 10 wherein one or more files in the set of files, upon notification of a scrolling event or another event associated with a user action, causes the local application instance to render on the display of the output rendering computing device some part of the one or more other portions of the cache without receiving further draw commands from the code execution computing device.

12. The method of claim 8 wherein obtaining the draw commands includes providing the draw commands to the local application instance to facilitate the one or more loaded files to cause the local application instance to render the one or more portions of the output of the remote application instance based on the draw commands without obtaining bitmap rasterizations of the draw commands from the code execution computing device to render the one or more portions of the output of the remote application instance.

13. A computer-implemented method for improving one or more computer technologies, comprising:

under control of a client computing device that is remotely located, separate, and distinct from a server computing device:

providing the server computing device a request to initiate a remote application in the server computing device while the client computing device executes an instance of a client application, the request indicating an operating system of the client computing device and an application type of the client application, the remote application instance having a current compositor, a current region renderer, or a current graphics library determined based on one or more of the operating system of the client computing device and/or the application type of the local application in the client computing device;

responsive to the request, obtaining a set of files from the server computing device based on the received request and the one or more of the current compositor, the current region renderer, or the current graphics library, the set of files including a script file, an executable code file, and a Hypertext Markup Language ("HTML") file that include information that modifies the client application instance to display output of the remote application instance, wherein the script file is configured to interface with an application programming interface ("API") of the client application instance to cause the client application instance to load the executable code file, is configured to intercept events from an event loop to listen for events associated with the client application instance and invoke draw handling code, and is configured to initiate a connection from the client application instance to the remote application instance, wherein the executable code file includes the draw handling code in a compiled instance of a graphics library of the remote application instance, the compiled instance of the graphics library being configured to cause draw commands to be rendered in the same manner on the client application instance as on the remote application instance to facilitate consistent rendering on the client application instance and on the remote application instance, and obtaining draw commands from the remote application instance; and rendering one or more portions of the output of the remote application instance based on the obtained draw commands.

14. The method of claim 13 wherein obtaining the draw commands includes providing to the client application instance the draw commands to facilitate the loaded executable code file to cause the client application instance to render the one or more portions of the output of the remote application instance based on the draw commands without sending bitmap rasterizations of the draw commands from the server computing device to render the one or more portions of the output of the remote application instance.

15. The method of claim 13 wherein the loaded executable code file is configured to cause the client application instance to render one or more layers to a cache based on the draw commands obtained from the server computing device, wherein one or more portions of the cache are caused to be rendered on a display of the client computing device based on a portion of the obtained draw commands, and wherein one or more other portions of the cache are not yet caused to be rendered on the display of the client computing device and are based on another portion of the obtained draw commands.

16. The method of claim 15 wherein the cache includes one or more of an image cache, a texture cache, a font cache, a shape cache, a curve cache, or a draw command cache.

17. The method of claim 15 wherein the loaded executable code file, upon notification of a scrolling event or another event associated with a user action, causes the client application instance to render on the display of the client computing device some part of the one or more other portions of the cache not yet caused to be rendered without receiving further draw commands from the server computing device.

18. The method of claim 13, further comprising:
detecting a user action associated with an event that causes one or more portions of a cache of the remote application instance to be updated;
providing an indication of the detected user action to the server computing device to cause the server computing device to intercepting further draw commands from one or more of the compositor or the region renderer of the remote application instance, the further draw commands being associated with updating the one or more portions of the cache of the remote application instance; and
obtaining from the server computing device the further draw commands; and
based on the obtained further draw commands, rendering an update to one or more portions of a cache of the client application instance, the one or more portions of the cache of the client application instance corresponding to the one or more updated portions of the cache of the remote application instance.

19. The method of claim 13, further comprising:
providing to the server computing device one or more indicators of one or more characteristics of one or more of the client application instance or a data channel connecting the server computing device and the client computing device;
based on a determination of whether further draw commands associated with one or more portions of the output facilitates higher performance than pixel information associated with the one or more portions of the output based on an evaluation of the one or more characteristics, obtaining from the server computing device whichever one of the further draw commands or the pixel information is determined to facilitate higher performance; and
rendering one or more portions of the output of the remote application instance based on the obtained further draw commands or the obtained pixel information.

20. The method of claim 19 wherein the evaluating includes determining a data bandwidth and/or a latency and comparing the data bandwidth and/or the latency to one or more thresholds to determine whether the further draw commands facilitate higher performance than the pixel information.

* * * * *